(12) United States Patent
Nomura et al.

(10) Patent No.: US 10,102,070 B2
(45) Date of Patent: Oct. 16, 2018

(54) INFORMATION PROCESSING SYSTEM, STORAGE APPARATUS AND STORAGE DEVICE

(71) Applicant: Hitachi, Ltd., Tokyo (JP)

(72) Inventors: Shimpei Nomura, Tokyo (JP); Akifumi Suzuki, Tokyo (JP); Mitsuhiro Okada, Tokyo (JP); Satoshi Morishita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/531,795

(22) PCT Filed: Jun. 1, 2015

(86) PCT No.: PCT/JP2015/065719
§ 371 (c)(1),
(2) Date: May 31, 2017

(87) PCT Pub. No.: WO2016/194095
PCT Pub. Date: Dec. 8, 2016

(65) Prior Publication Data
US 2017/0322845 A1 Nov. 9, 2017

(51) Int. Cl.
*G06F 11/00* (2006.01)
*G06F 11/10* (2006.01)
(Continued)

(52) U.S. Cl.
CPC ........ *G06F 11/1076* (2013.01); *G06F 3/0613* (2013.01); *G06F 3/0659* (2013.01); *G06F 3/0689* (2013.01); *G06F 12/0804* (2013.01)

(58) Field of Classification Search
CPC .. G06F 11/1076; G06F 3/0613; G06F 3/0659; G06F 3/0689; G06F 12/0804;
(Continued)

(56) References Cited

U.S. PATENT DOCUMENTS 5,640,506 A * 6/1997 Duffy ................. G06F 11/1076
714/49
6,098,191 A 8/2000 Yamamoto et al.
(Continued)

FOREIGN PATENT DOCUMENTS

JP 07-261946 A 10/1995
JP 10-074129 A 3/1998
(Continued)

OTHER PUBLICATIONS

International Search Report of PCT/JP2015/065719 dated Aug. 18, 2015.

*Primary Examiner* — Christine T. Tu
(74) *Attorney, Agent, or Firm* — Mattingly & Malur, PC

(57) ABSTRACT

A purpose is to speed up a write process with a parity update. An information processing system includes storage devices constituting a RAID group, coupled to one bus and communicating with each other. Each of the storage devices includes a device controller and a storage medium for storing data. The storage devices include a first storage device storing old data and a second storage device storing old parity associated with the old data. A first device controller of the first storage device creates intermediate parity based on the old data and new data for updating the old data and transmit the intermediate parity to the second storage device specifying the second storage device storing the old parity associated with the old data, and a second device controller of the second storage device creates new parity based on the intermediate parity and the old parity.

18 Claims, 22 Drawing Sheets

(51) Int. Cl.
*G06F 3/06* (2006.01)
*G06F 12/0804* (2016.01)

(58) Field of Classification Search
CPC ........... G06F 2212/26; G06F 2212/261; G06F 2212/262; G06F 2212/657
See application file for complete search history.

(56) References Cited

U.S. PATENT DOCUMENTS

| | | | |
|---|---|---|---|
| 6,526,477 B1* | 2/2003 | Yuan | G06F 3/061 710/52 |
| 2007/0283079 A1 | 12/2007 | Iwamura et al. | |
| 2010/0064097 A1 | 3/2010 | Iwamura et al. | |
| 2011/0119435 A1 | 5/2011 | Iwamura et al. | |
| 2011/0238885 A1 | 9/2011 | Kitahara et al. | |
| 2012/0173802 A1 | 7/2012 | Iwamura et al. | |
| 2012/0297244 A1 | 11/2012 | Kitahara et al. | |
| 2013/0103895 A1 | 4/2013 | Iwamura et al. | |
| 2013/0290613 A1 | 10/2013 | Uehara et al. | |
| 2013/0290629 A1 | 10/2013 | Uehara et al. | |
| 2014/0304461 A1 | 10/2014 | Kitahara et al. | |
| 2016/0259687 A1* | 9/2016 | Yoshihara | G06F 3/0619 |
| 2017/0177437 A1* | 6/2017 | Moertl | G06F 11/1076 |

FOREIGN PATENT DOCUMENTS

| | | |
|---|---|---|
| JP | 2007-323224 A | 12/2007 |
| JP | 2012-519319 A | 8/2012 |
| JP | 2014-203233 A | 10/2014 |
| JP | 2015-515033 A | 5/2015 |

\* cited by examiner

810

RAID MANAGEMENT INFORMATION

| RAID GROUP # | RAID LEVEL | RAID CONFIGURATION | STRIPE SIZE | DEVICE # | DEVICE OFFSET | DEVICE SIZE |
|---|---|---|---|---|---|---|
| 0 | RAID5 | 3D1P | 16KB | 0 | 0 | 90000 |
|   |   |   |   | 1 | 100000 | 90000 |
|   |   |   |   | 2 | 200000 | 90000 |
|   |   |   |   | 3 | 300000 | 90000 |
| ... | ... | ... | ... | ... | ... | ... |

LOCK MANAGEMENT INFORMATION

| PROCESS # | PROCESS TYPE | RAID GROUP # | DEVICE # | DEVICE LBA | LOCK STATE |
|---|---|---|---|---|---|
| 1 | WRITE | 0 | 2 | 2 | STRIPE LOCK |
| 2 | READs | 0 | 0 | 1 | — |
| ... | ... | ... | ... | ... | ... |

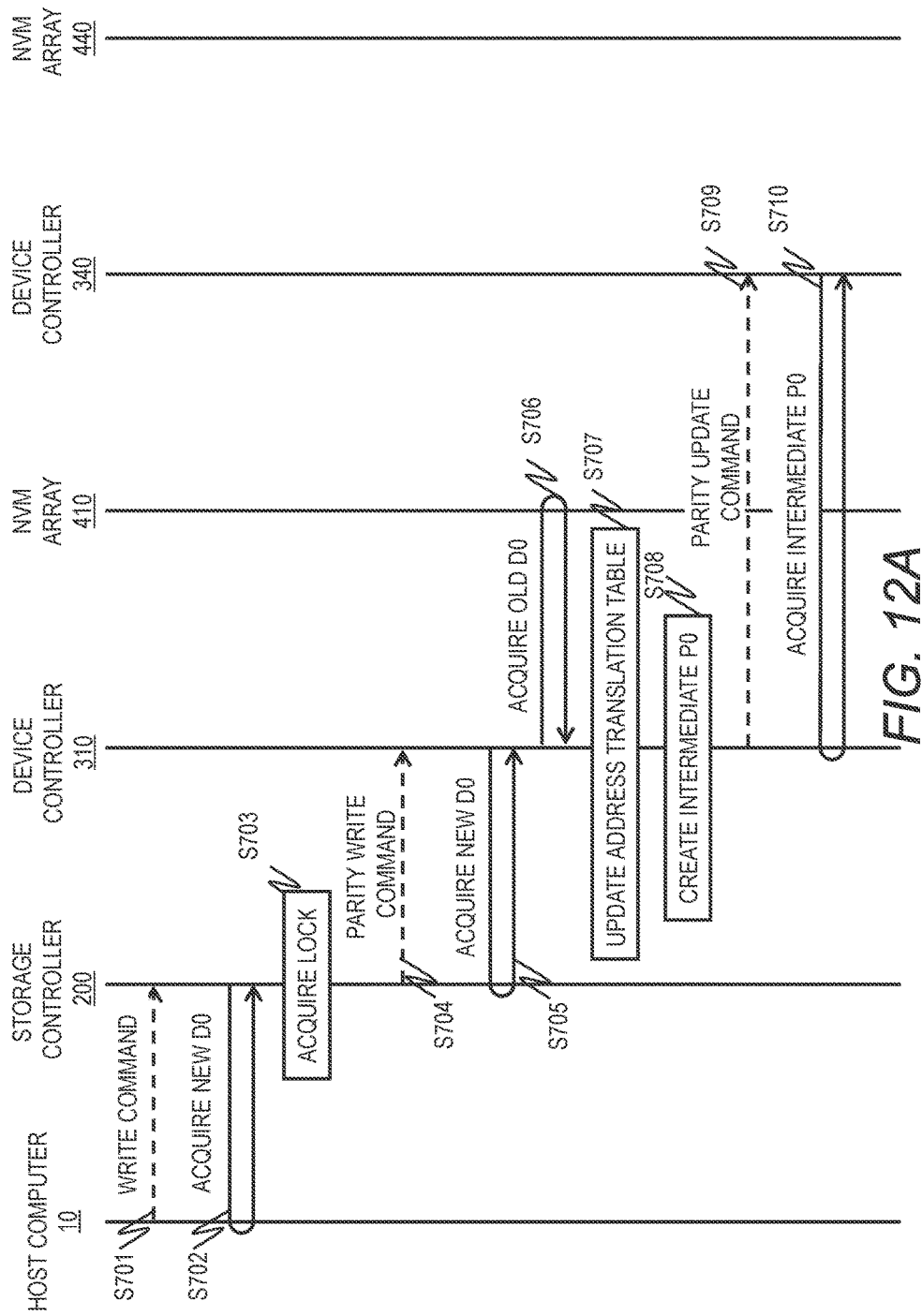

| INTER-STORAGE DEVICE PATH STATUS TABLE (1410) | | | | | | |
|---|---|---|---|---|---|---|
| | | TRANSFER DESTINATION | | | | |
| | | STORAGE DEVICE 31 | STORAGE DEVICE 32 | STORAGE DEVICE 33 | STORAGE DEVICE 34 | STORAGE DEVICE 35 |
| TRANSFER SOURCE | STORAGE DEVICE 31 | | IN-USE TIMEOUT: 0 | IN-USE TIMEOUT: 0 | IN-USE TIMEOUT: 4 | NON-USE |
| | STORAGE DEVICE 32 | IN-USE TIMEOUT: 1 | | IN-USE TIMEOUT: 0 | IN-USE TIMEOUT: 5 | NON-USE |
| | STORAGE DEVICE 33 | IN-USE TIMEOUT: 0 | IN-USE TIMEOUT: 0 | | IN-USE TIMEOUT: 7 | NON-USE |
| | ... | | | | | |

*FIG. 13A*

OFFLOAD FUNCTION STATUS TABLE (1420)

| STORAGE DEVICE No. | PARITY UPDATE | DUPLICATE WRITE |
|---|---|---|
| STORAGE DEVICE 31 | IN-USE | NON-USE |
| STORAGE DEVICE 32 | IN-USE | NON-USE |
| STORAGE DEVICE 33 | IN-USE | NON-USE |
| STORAGE DEVICE 34 | IN-USE | NON-USE |
| STORAGE DEVICE 35 | NON-USE | IN-USE |
| STORAGE DEVICE 36 | NON-USE | IN-USE |
| ... | | |

*FIG. 13B*

INFORMATION PROCESSING SYSTEM, STORAGE APPARATUS AND STORAGE DEVICE

BACKGROUND

The present invention relates to an information processing system, a storage apparatus and a storage device.

Along with spread of solid state drives (SSDs) using NAND flash memory as a memory medium, SSDs become more widely used as internal storage devices in storage systems instead of hard disk drives (HDDs). An SSD allows faster access than an HDD and SSDs installed in a storage apparatus as storage devices allow high-speed processing of the storage apparatus. Development has been carried out for practical use of storage devices equipped with nonvolatile semiconductor memory capable of faster access than flash memory, such as resistance random access memory (Re-RAM) and phase change random access memory (PRAM). However, the performance of a storage controller in a storage system does not keep up with the speed-up of a storage device and it cannot fully utilize the performance of the high-speed storage device.

On the other hand, the storage apparatus uses a technology called redundant array of independent (or inexpensive) disks (RAID) for high reliability of the system. RAID manages a plurality of storage devices as a group (hereinafter referred to as a RAID group) and creates redundant data called parity from data. Then, RAID stores data and parity to different storage devices within the RAID group, respectively. When a storage device fails, RAID can restore data stored in the failed storage device from data and parity stored in the other storage devices.

However, in the configuration using the parity, it is required to update parity each time of writing data to a storage device and the data transfer occurs due to the parity update, which is a factor preventing a speedup of a write process by a storage controller. In addition, some types of RAID achieve high reliability by duplicating data, that is, by storing data and redundant data identical to the data to two different storage devices, respectively. This configuration also needs to update the duplicated data each time of data write to a storage device, which is a degradation factor of the processing performance of the storage controller. In recent years, there is a great demand for analyzing large amounts of data called big data, and the processing load of the storage controller to transfer data is increasing.

U.S. Pat. No. 6,098,191 A reduces the processing load of a storage controller by the technology described below. First, the storage controller transfers new data received from a host computer to a first storage device storing old data. The first storage device creates intermediate parity based on the old data and the new data. The storage controller reads the intermediate parity from the first storage device, and transfers the intermediate parity to a second storage device storing old parity. The second storage device creates new parity on the basis of the old data and the intermediate parity. Accordingly, updating of the parity associated with updating of the data is performed.

SUMMARY

In the technique of U.S. Pat. No. 6,098,191 A, the storage controller controls data transfer between the storage devices for updating the parity, and therefore the processing load of the storage controller is not sufficiently reduced. More specifically, the technique of U.S. Pat. No. 6,098,191 A transfers data three times between the storage controller and the storage devices for updating the parity along with a single data write. The three times of data transfer consists of (1) transfer of the new data from the storage controller to the first storage device, (2) transfer of the intermediate parity from the first storage device to the storage controller, and (3) transfer of the intermediate parity from the storage controller to the second storage device. Further, because data of all the storage devices constituting the RAID group is transferred via the storage controller, the data transfer load is concentrated on the bus in the storage controller. Therefore, the bus acts as a bottleneck if the number of storage devices is increased and hence the performance is not improved.

Therefore, the processing load of the storage controller to transfer data among a large number of storage devices is still large, which prevents a speedup of the write process.

An information processing system includes a plurality of storage devices constituting a RAID group, coupled to one bus and communicating with each other. Each of the plurality of storage devices includes a device controller and a storage medium for storing data. The plurality of storage devices include a first storage device storing old data and a second storage device storing old parity associated with the old data. A first device controller of the first storage device is configured to create intermediate parity based on the old data and new data for updating the old data and transmit the intermediate parity to the second storage device specifying the second storage device storing the old parity associated with the old data, and a second device controller of the second storage device is configured to create new parity based on the intermediate parity and the old parity.

In an update process of parity accompanying a data write, the number of data transfers between a storage controller and storage devices is reduced, which decreases the processing load of the storage controller and speeds up the write process.

BRIEF DESCRIPTION OF THE DRAWINGS

FIG. 9 is a diagram of management information.
FIG. 10 is a diagram of lock management information.
FIG. 12A is a diagram of a ladder chart depicting an operation according to the first embodiment.
FIG. 13A is a diagram of a management screen.
FIG. 13B is a diagram of the management screen.

DETAILED DESCRIPTION OF THE EMBODIMENTS

First Embodiment

Embodiments of the present invention will be described with reference to the drawings. It should be noted that the present invention is not limited to the embodiments described below.

Figure 1:
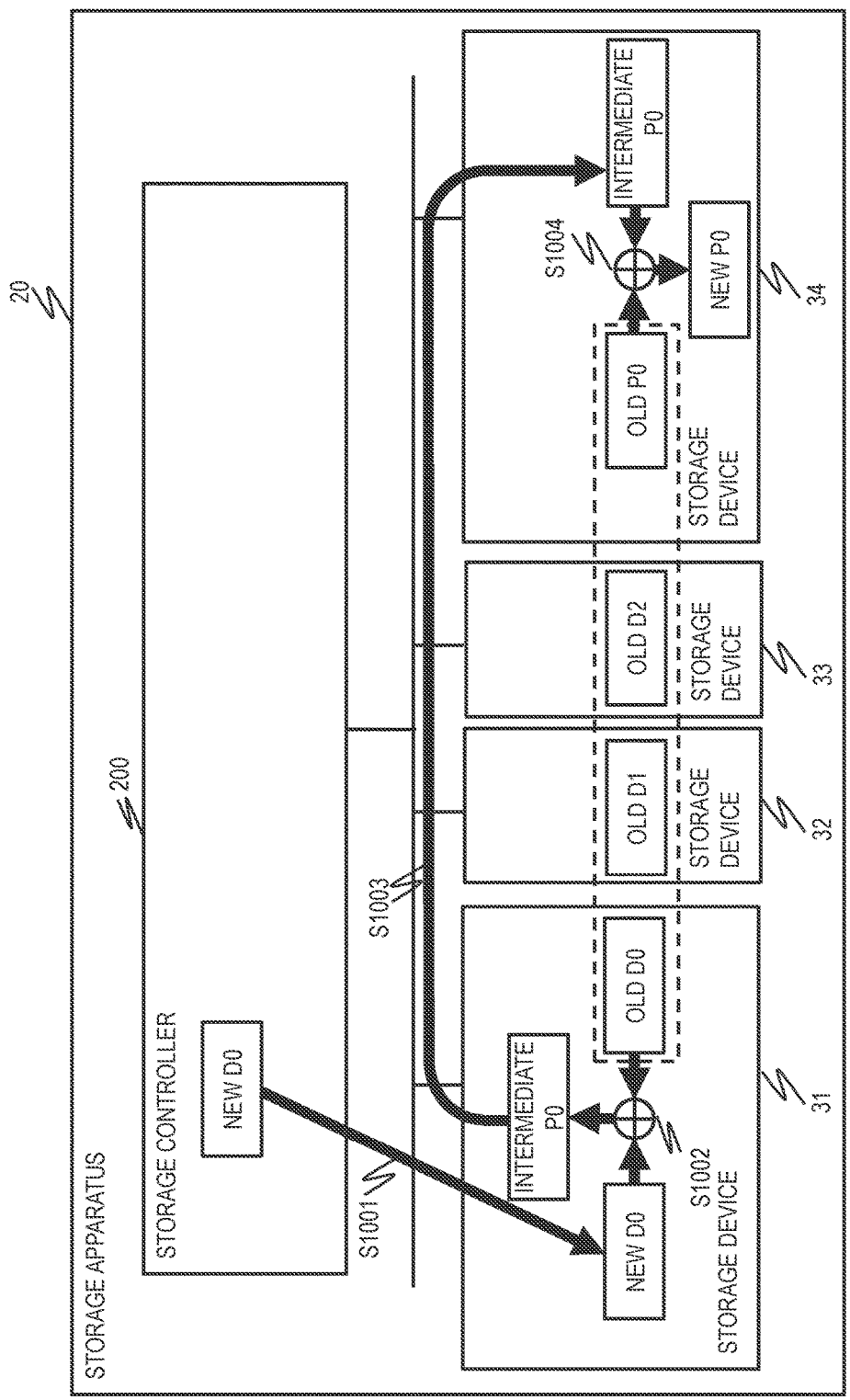
FIG. 1 is a diagram of an overview of an embodiment.

FIG. 1 depicts an overview of this embodiment. A storage apparatus 20 includes a storage controller 200, and storage devices 31 to 34. Storage devices 31 to 34 are connected with one bus 270 and can communicate with each other. The storage controller 200 is connected to the same bus 270 as the storage devices 31 to 34.

The storage controller 200 receives a read command or a write command from an external host computer of the storage apparatus 20, and accesses the storage device according to the request of the host computer.

Each of the storage devices 31 to 34 includes a device controller and a storage medium (not shown). The device controller stores data received from an external device of the storage device into the storage medium, and reads the data from the storage medium to transfer to the external device of the storage device. A storage medium in this embodiment is nonvolatile semiconductor memory.

In this embodiment, a RAID group of RAID 5 (3 Data+1 Parity) configured on the basis of four storage devices is given as an example. Parity is created for each stripe in accordance with a predetermined rule in RAID 5. In the example illustrated in FIG. 1, old Parity 0 (old P0) is created based old Data 0 (old D0), old Data 1 (old D1) and old Data 2 (old D2). For example, old Parity 0 is created by an exclusive OR operation (hereinafter, XOR operation) of old Data 0, old Data 1 and old Data 2. Old Data 0, old Data 1, old Data 2 and old Parity 0 are distributed across the storage devices 31 to 34 and stored one by one in the storage devices 31 to 34. If old Data 1 is no longer be read due to a failure or the like of the storage device, old Data 1 is restored by an XOR operation of old Data 0, old Data 2 and old Parity 0.

Thus, parity is created in case data is lost. Therefore, when data in a stripe is updated, the parity of the stripe containing the data must also be updated.

Then, an update process of parity with a data update will be explained. The storage controller 200 receives new Data 0 from the host computer. The storage controller 200 transfers new Data 0 through the bus 270 to the storage device 31 storing old Data 0. New Data 0 is data to update old Data 0. The storage device 31 receives new Data 0 (S1001). The device controller of the storage device 31 performs an XOR operation of new Data 0 and old Data 0 to create an intermediate Parity 0 (intermediate P0) (S1002). Next, the storage device 31 identifies the storage device 34 storing old Parity 0, and transmits intermediate Parity 0 to the storage device 34 via the bus 270 (S1003).

The storage device 34 receives the intermediate Parity 0, performs an XOR operation of the intermediate Parity 0 and old Parity 0 to create new parity (new P) 0 (S1004).

The above is the outline of the parity update process. The above described process transfers the intermediate parity between storage devices without intervention of the storage controller. One time parity update process includes only one time data transfer of the new data between the storage controller and the storage device. Therefore, it is possible to decrease the transfer processing load of the storage controller associated with the parity update and eliminate the concentration of data transfer load onto the bus in the storage controller. Therefore, the write process of the storage system is accelerated.

Figure 2:
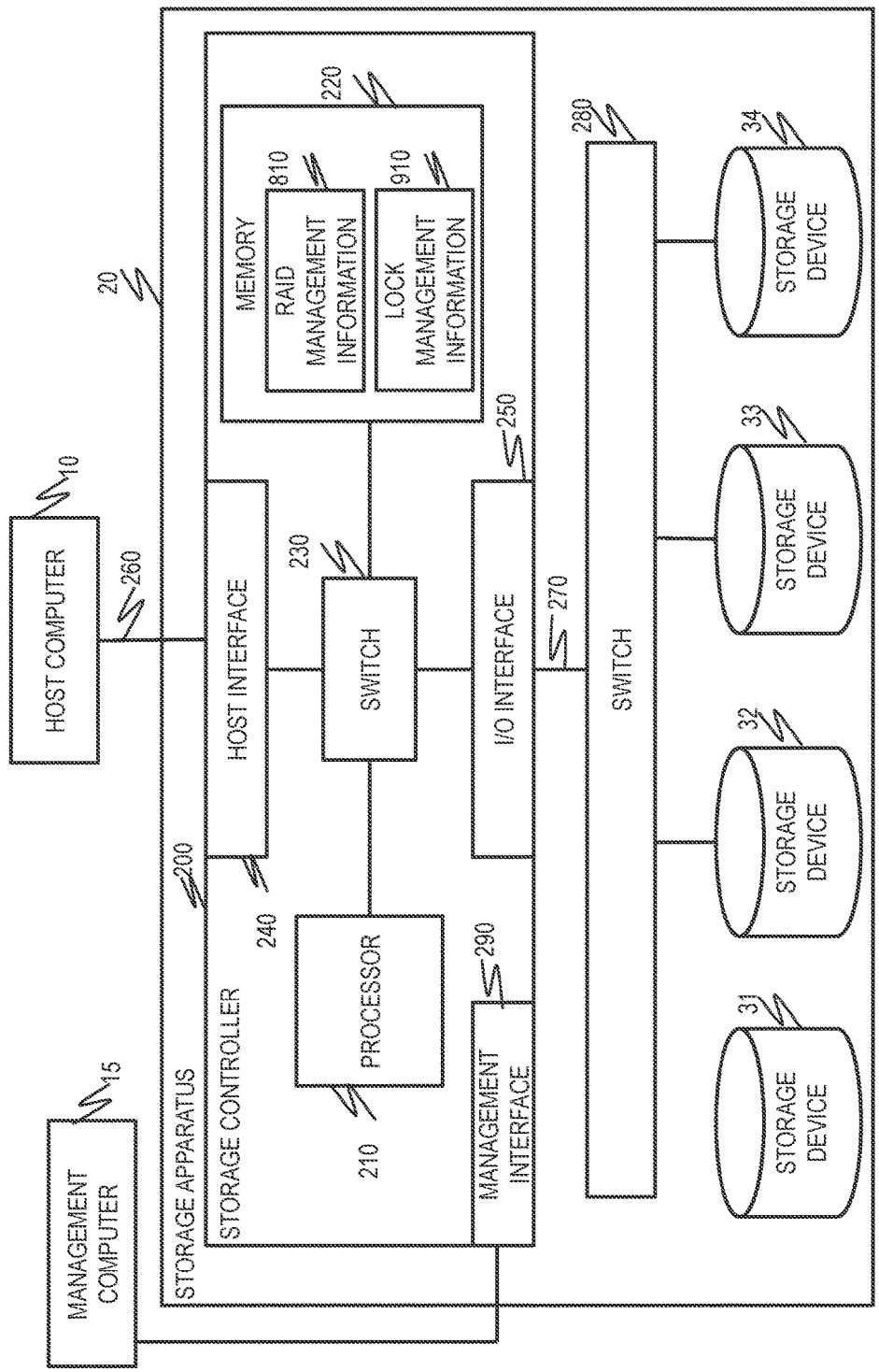
FIG. 2 is a diagram of the physical configuration of a storage apparatus.
Figure 3:
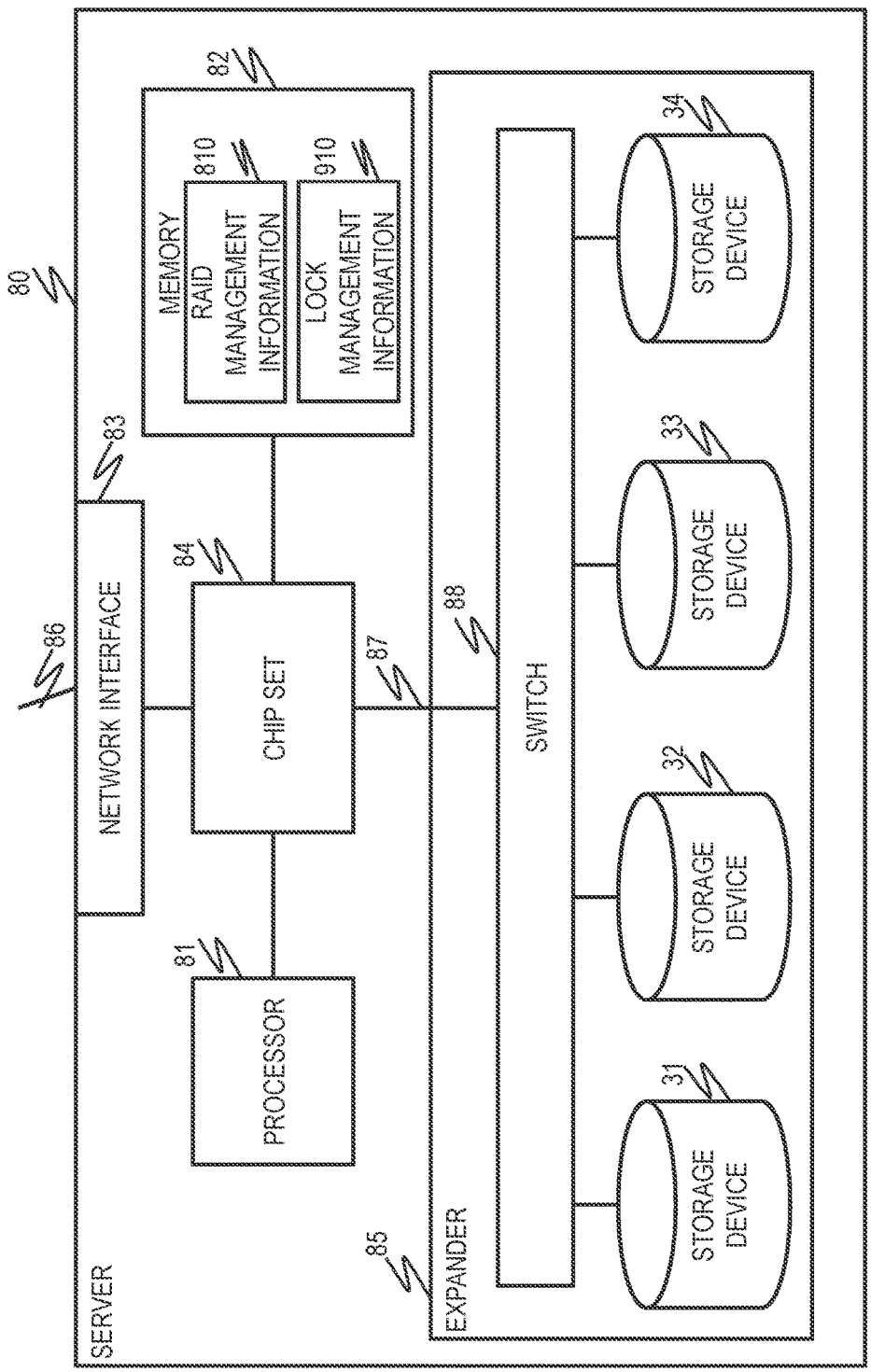
FIG. 3 is a diagram of the physical configuration of a server.

This embodiment can be applied to an information processing system shown in FIGS. 2 and 3.

FIG. 2 depicts the physical configuration of the storage apparatus 20 (hereinafter, a system configuration 1) according to an embodiment of the present invention. The storage apparatus 20 is connected with a host computer 10 via a network 260. The network 260 is, for example, a storage area network (SAN) or a local area network (LAN). The storage apparatus 20 is connected with the management computer 15 as with the host computer.

The host computer 10 includes hardware resources such as a processor, a memory, an input/output device, a host bus adapter, and software resources such as device drivers, an operating system (OS) and application programs. In the host computer 10, the processor creates a command according to a program in the memory (for example, read command or write command), and transmits via the network 260 to the storage apparatus 20. The configuration of the management computer 15 is the same as the host computer 10.

The storage apparatus 20 includes the storage controller 200, a switch 280 and the plurality of (for example, four) storage devices 31 to 34. Each of the plurality of storage devices 31 to 34 is connected with the switch 280 by an internal bus (for example, PCI-Express (PCIe) bus). Thus, the plurality of storage devices is connected with each other, allowing End-to-End communication between the storage devices. Further, the storage controller 200 and the switch 280 are connected, and the storage controller 200 is able to access the plurality of storage devices.

Figure 17:
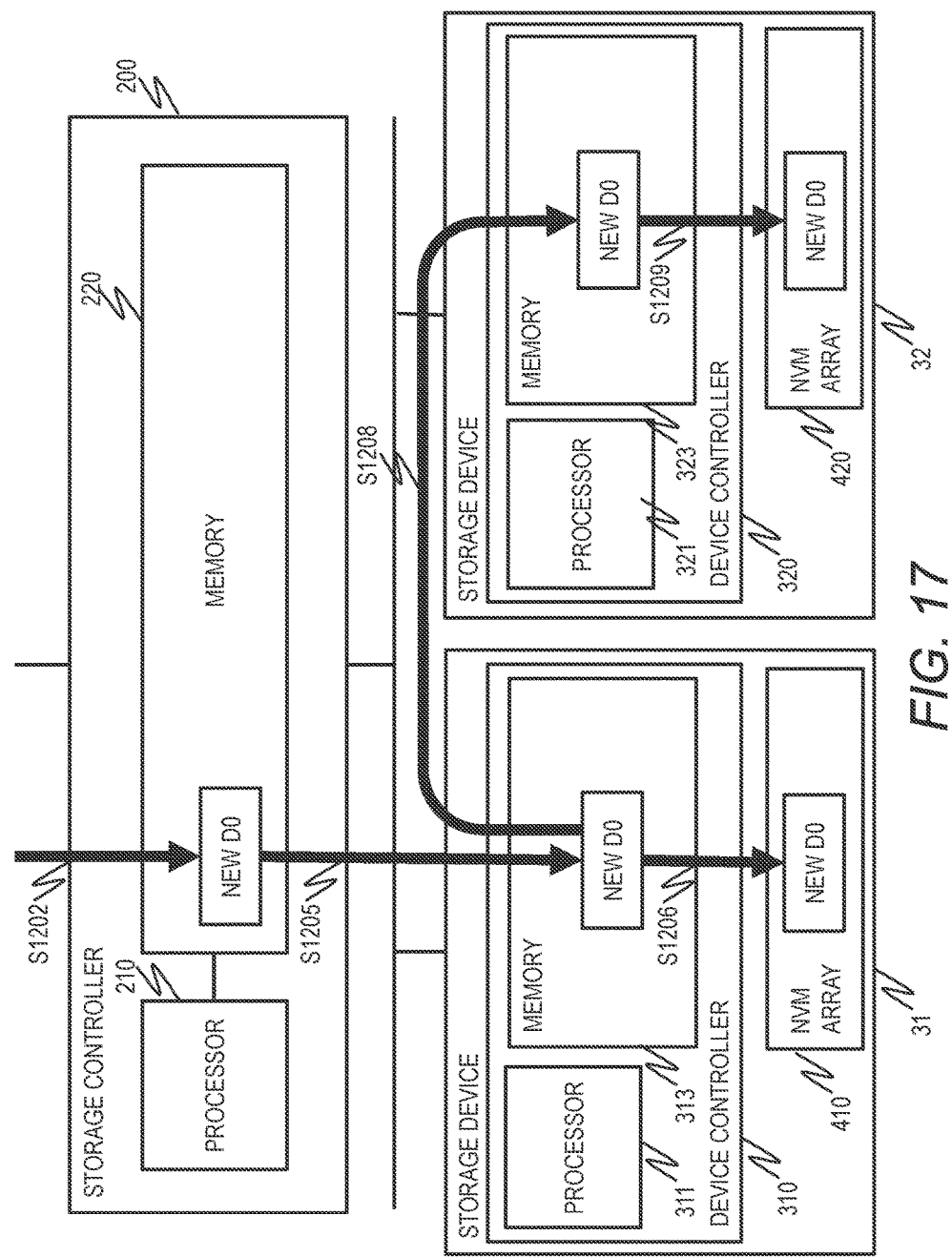
FIG. 17 is a diagram data flows according to the third embodiment.

The storage controller 200 includes a processor 210, a memory 220, a switch 230, a host interface 240, an I/O interface 250 and a management interface 290. The storage controller 200 receives a command from the host computer 10, controls the whole storage apparatus 20, and provides a management screen 1800 as shown in FIG. 17.

The processor 210, based on a program, analyzes the command received from the host computer 10, performs arithmetic processing, and controls the entire storage apparatus 20 by issuing an instruction to each part of the storage controller 200. The memory 220 stores management information of the entire storage apparatus 20 (for example, RAID management information 810 and lock management information 910), and stores temporarily a read command and a write command from the host computer 10, and command target data.

The switch 230 connects the processor 210, the memory 220, the host interface 240 and the I/O interface 250 in the storage controller 200, and routes data exchanged between the components according to the address or the ID.

The host interface 240 is connected with the host computer 10 via the network 260. The host interface 240 transmits/receives data to/from the host computer 10 according to an instruction from the processor 210 or a request from the host computer 10. Data transmitted/received by the host interface 240 is stored in the memory 220. The management interface 290 has the same configuration as the host interface 240 and is connected with the management computer 15.

The I/O interface 250 is connected with the storage devices 31 to 34 through the bus 270. The I/O interface 250 transmits/receives data to/from the storage devices 31 to 34 according to an instruction from the processor 210 or a request from the storage devices 31 to 34. Data transmitted/received by the I/O interface 250 is stored in the memory 220. The bus 270 is, for example, a PCIe bus.

FIG. 3 depicts the physical configuration of a server (hereinafter, a system configuration 2) according to an embodiment of the present invention. The system includes a database server (hereinafter, referred to as a server) 80 connected with the network 86. The network 86, for example, a LAN. The network 86 is connected with a plurality of client terminals, the server 80 receives a database processing request created by a client terminal or the server 80, and returns the analysis result. It should be noted that, in the present configuration, the server 80 is a database server as an example; however, the server 80 may provide a service other than database, like a file server, for example. The server 80 obtains information from the storage devices 31 to 34 in the server, and provides the management screen 1800 as shown in FIG. 17 to a user.

The Server 80 includes a processor 81, a memory 82, a network interface 83, a chipset 84 and an expander 85.

The processor 81, based on a program, analyzes requests created by the clients terminals and the server 80, and performs the overall control of the the server 80 and various calculations.

The memory 82 stores programs executed by the processor 81 and management information for the entire server 80 (for example, the RAID management information 810 and the lock management information 910), and stores temporarily requests and data to be analyzed.

The network interface 83 is connected with the network 86. The network interface 83 transmits/receives data to/from a client terminal connected with the network 86 according to an instruction from the processor 81 or a request from the client terminal. Data to be transmitted/received by the network interface 83 is stored in the memory 82.

The chipset 84 connects the processor 210, the memory 220, the host interface 240 and the I/O interface 250 in the storage controller 200, and routes data exchanged between the components according to the address or the ID.

The expander 85 is provided with the plurality of (for example, four) storage devices 31 to 34 and the switch 88 inside. It should be noted that the storage devices 31-34 may be configured to be directly connected with the chipset 84 without the expander 85. The storage devices 31 to 34 inside the expander 85 are connected with the switch 88. The switch 88 is connected through the chipset 84 and the bus 87. The bus 87 is, for example, a PCI Express bus or a SAS bus.

Figure 4:
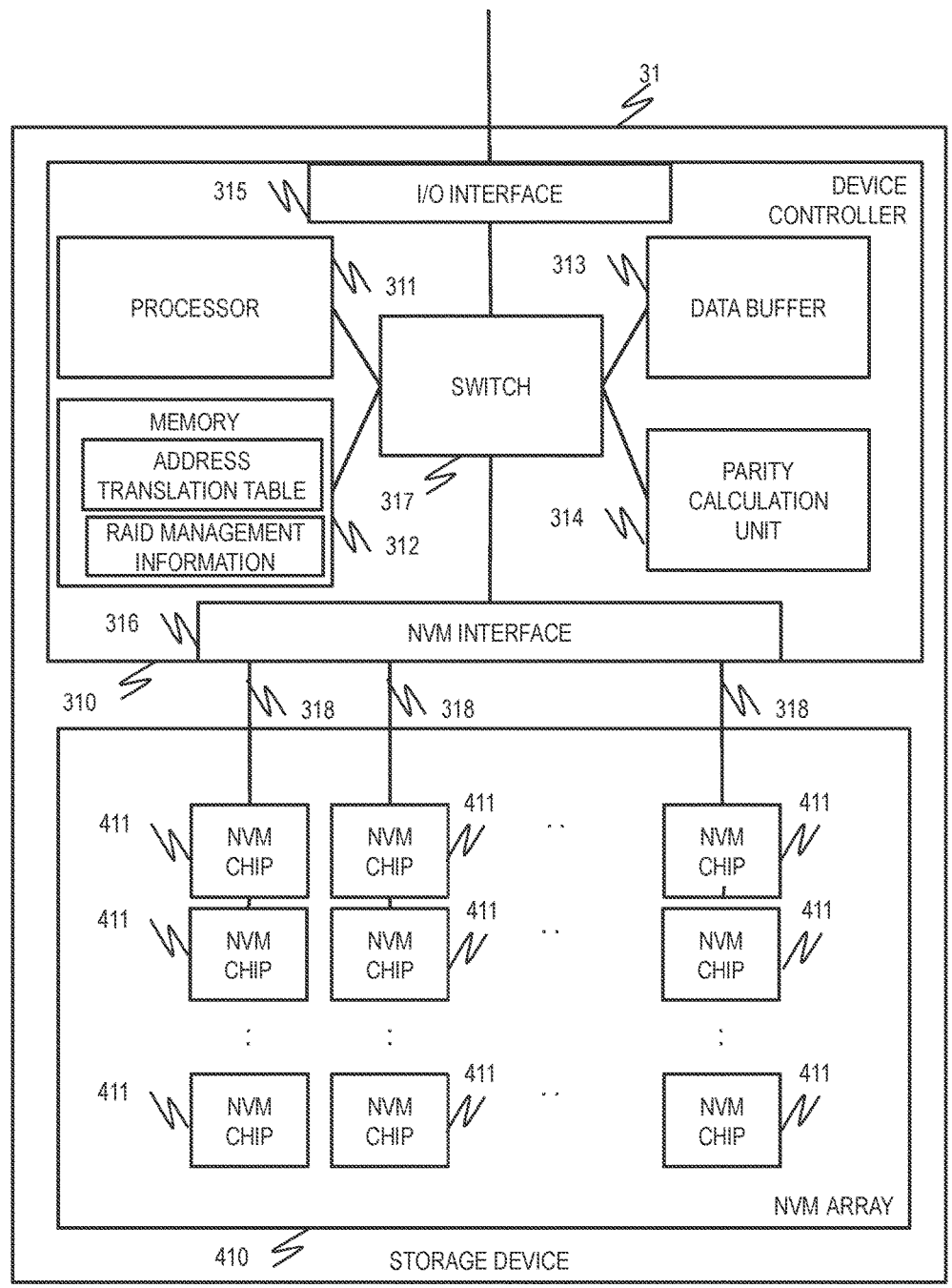
FIG. 4 is a diagram of the configuration of a storage device.

FIG. 4 depicts a configuration example of a storage device using nonvolatile memory (NVM) as a storage medium. This embodiment uses the storage devices 31 to 34 with the same configuration and the storage device 31 will be described as an example.

The storage device 31 includes a device controller 310 and an NVM array 410. The device controller 310 and the NVM array 410 are connected by a plurality of buses 318.

The device controller 310 includes a processor 311, a memory 312, a data buffer 313, a parity calculation unit 314, an I/O interface 315, an NVM interface 316 and a switch 317. These components may be implemented in a semiconductor element such as an application specific integrated circuit (ASIC) and a field programmable gate array (FPGA), or configured with separated dedicated integrated circuits (ICs) connected with each other.

The processor 311 analyzes requests from the storage controller 200 and the other storage devices 32 to 34 based on a program, and performs the overall control of the storage device 31 and calculations.

The memory 312 stores programs executed by the processor 311, the device management information 279 on the NVM array 410 and RAID management information distributed from the host device. It should be noted that the RAID configuration information may neither be distributed from the host device nor stored in the memory 312. In this case, information indicating the RAID configuration is attached to the parity write command described later.

The Data buffer 313 temporarily stores data of a read/write command and data in processing.

The parity calculation unit 314 is a computing device for executing processing required at the time of parity creation. The parity calculation unit 314, for example, is a hardware circuit for executing an XOR operation. This embodiment shows the parity calculation unit 314 of a hardware circuit; however the device controller 310 may have a function of parity calculation in a different form. For example, the processor 311 may execute the parity calculation by executing a program.

The I/O interface 315 is connected with the storage controller 200 and the other storage devices 32 to 34 via the bus 270. The I/O interface 315 transmits/receives data to/from the storage controller 200 or the other storage devices 32 to 34 according to an instruction from the processor 311 or a request from the storage controller 200 or the other storage devices 32 to 34. Data to be transmitted/received by the I/O interface 315 is stored in the data buffer 313.

The NVM interface 316 is connected with the NVM array 410 via a plurality of buses 318. The NVM interface 316 transmits/receives data to/from the NVM array 410 in accordance with an instruction from the processor 311. Data to be transmitted/received is stored in the data buffer 313.

The switch 317 is connected with each part of the device controller 310 and relays data to be transferred between the parts.

Figures 5, 6:
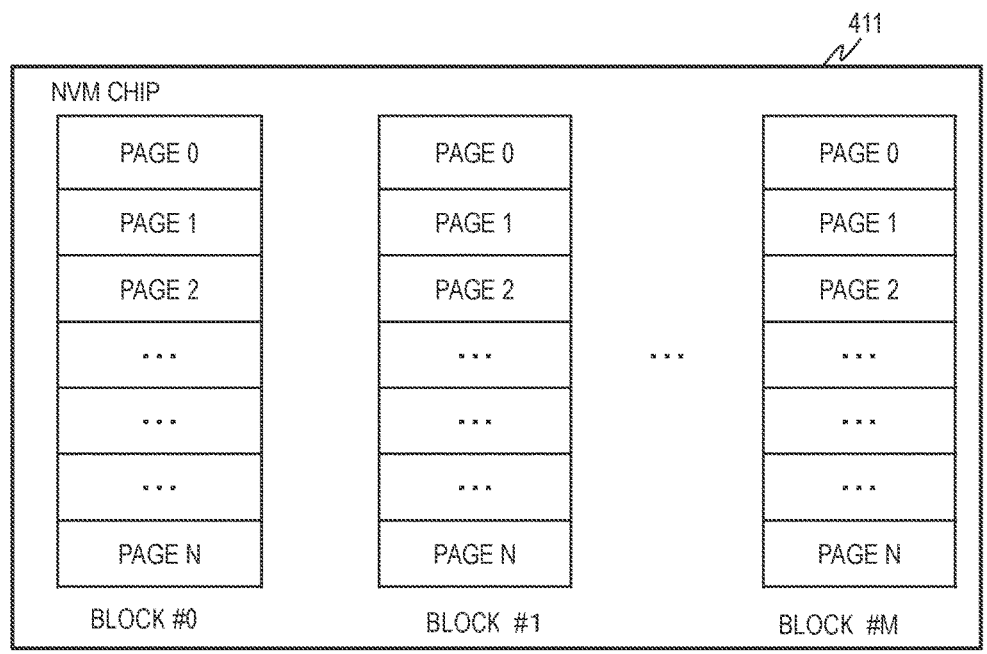
FIG. 5 is a diagram of the physical configuration of a NVM chip.
FIG. 6 is a diagram of an address translation table.

FIG. 5 depicts the physical configuration of a NVM chip. The NVM array 410 includes a plurality of NVM chips 411. The NVM chip 411 is, for example, a NAND flash memory chip. Each NVM chip 411 includes a plurality of blocks (physical blocks), and each block includes a plurality of pages (physical pages). For example, the flash memory cannot overwrite data. The flash memory deletes data block by block and read/write data page by page. This embodiment describes an example in which one page is 16 KB; however, the size of a page varies according to design and is not limited.

Further, the NVM chip may be a faster accessible memory chip than the flash memory chip, such as a PRAM chip and a ReRAM chip.

Next, described will be a logical storage space the device controller 310 of the storage device 31 provides to a device outside of the storage device. In this embodiment, the external device of the storage device is the processor 210 of the storage controller 200 or a processor 81 of the server 80.

The logic storage space includes a plurality of logical blocks and a logical address is allocated to each logical block. The CPU 210 of the storage controller 200 can read/write data in the logical area corresponding to a specified logical address by issuing an access command specifying the logical address in the storage device 31. Each of the plurality of physical regions constituting the physical storage space provided by the plurality of NVM chips 411 is allocated a physical address used within the storage device 31. In this embodiment, the physical address indicating the location of the the physical area in the storage device 31 is referred to as "physical block address (PBA)". The logical address indicating the location of the logical area of the storage device 31 is referred as "device logical block address (LBA)". PBA represents the position of 16 KB unit, which is the page size of NVM. This embodiment describes an example where the page size of NVM is the same as the management unit size of PBA; however, they may be different.

Flash memory is appending type memory and cannot overwrite data. Therefore, when the device controller 310 updates data, the device controller 310 stores the new data in a different page (referred to as a new page) from a page in which the old data is stored (referred to as an old page), and change the correspondence relation between the PBA of the old page and the device LBA to the correspondence relation between the PBA of the new page and the device LBA. The old page which lost the correspondence relation with the device LBA is a page to be erased. The storage device 31 managed correspondence relations between PBAs and device LBAs by the following address translation table, for example.

FIG. 6 depicts a configuration example of the address translation table 610. The address translation table 610 is stored in the memory 312 of the storage device 31 and contains a record for each logical block of the logical storage space provided by the storage device 31. Each record has information of the device LBA 611, the PBA 612 and the presence or absence of update data 613.

The device LBA 611 indicates the start addresses of predetermined size logical blocks divided from the logical storage space provided by the storage device 31. This embodiment describes an example in which the logical block size is 16 KB. This size is the same as the size of a page, which is a unit to be accessed in the NVM, and the blocks correspond one-to-one with the pages, facilitating the control of access to the NVM chip 411. The logical block size may be determined arbitrarily so long as the logical block size is smaller than the size of the logical storage space provided by the storage device 31. The PBA 612 indicates the positions of pages, which are physical areas.

The update information 613 indicates information to be held during the parity update process. "PRESENT" in the update information 613 means that an updating process is in execution and information indicating the storage location of the new data is stored in the cell of the update information 613. The information indicating the storage location of the new data represent, for example, address information indicating the area storing the new data in the data buffer 313 of the storage device 31 or the PBA storing the new data.

The reason why the update information 613 exists in this embodiment is as follows. Normally, when the storage device acquires new data, the storage device changes the PBA storing the old data to the PBA to store the new data. The old data cannot be read anymore and becomes data to be erased. As will be described in detail later, in this embodiment, when the storage device receives a parity write command instructing update of parity, the storage device maintains the old data in the readable state after receiving the new data with the parity write command until the update of the the parity is completed. Thereby, when an error occurs during the parity update process, the storage device can resume the update process from reading the old data in order to improve reliability. For this reason, the storage device needs to manage the storage locations of both the old data and the new data during the parity update process.

Using the example of FIG. 6, an operation for a received read command will be described.

For example, device LBA "0" is associated with PBA "0". When the device LBA specified by the read command is "0", the device controller 310 reads data from the page indicated by PBA '0', and responds to the storage controller 200. The device controller 310 reads the data from the PBA value stored in the PBA 612 regardless of whether the update information 613 indicates presence or absence.

When a PBA is not associated with a device LBA, the record of the PBA corresponding to the device LBA stores "unallocated". This indicates a state in which no data is stored for the device LBA.

In a case where the storage device is formatted by writing zero data to the NVM, for example, the storage device may manage the state as "unallocated". Alternatively, in a case where the storage device is formatted by writing zero data to the NVM, for example, the storage device may manage the state before data is written after being formatted as "allocated" because a PBA storing zero data is allocated to a device LBA.

Figure 7:
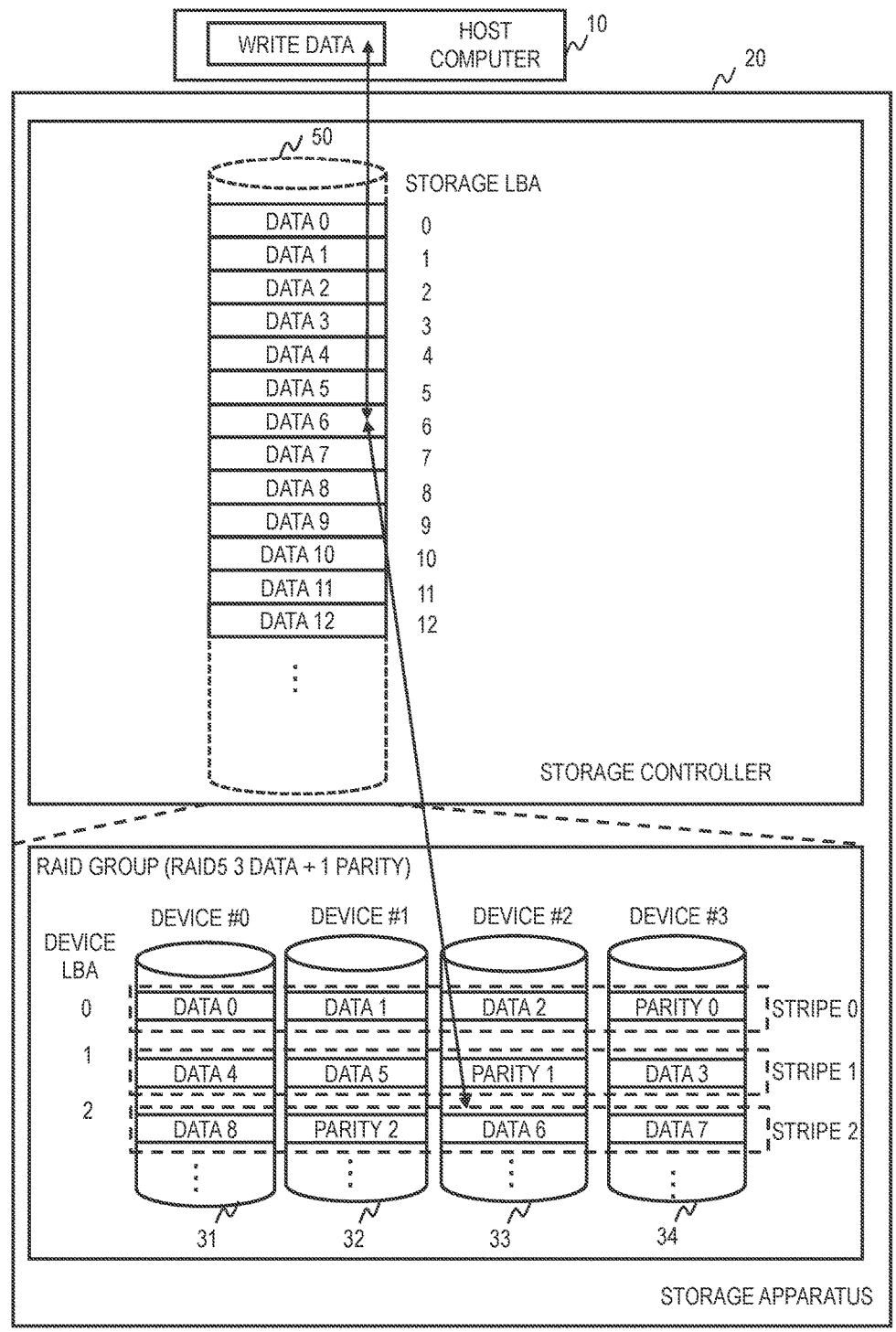
FIG. 7 is a diagram of data arrangements in a logical volume and RAID 5.
Figure 8:
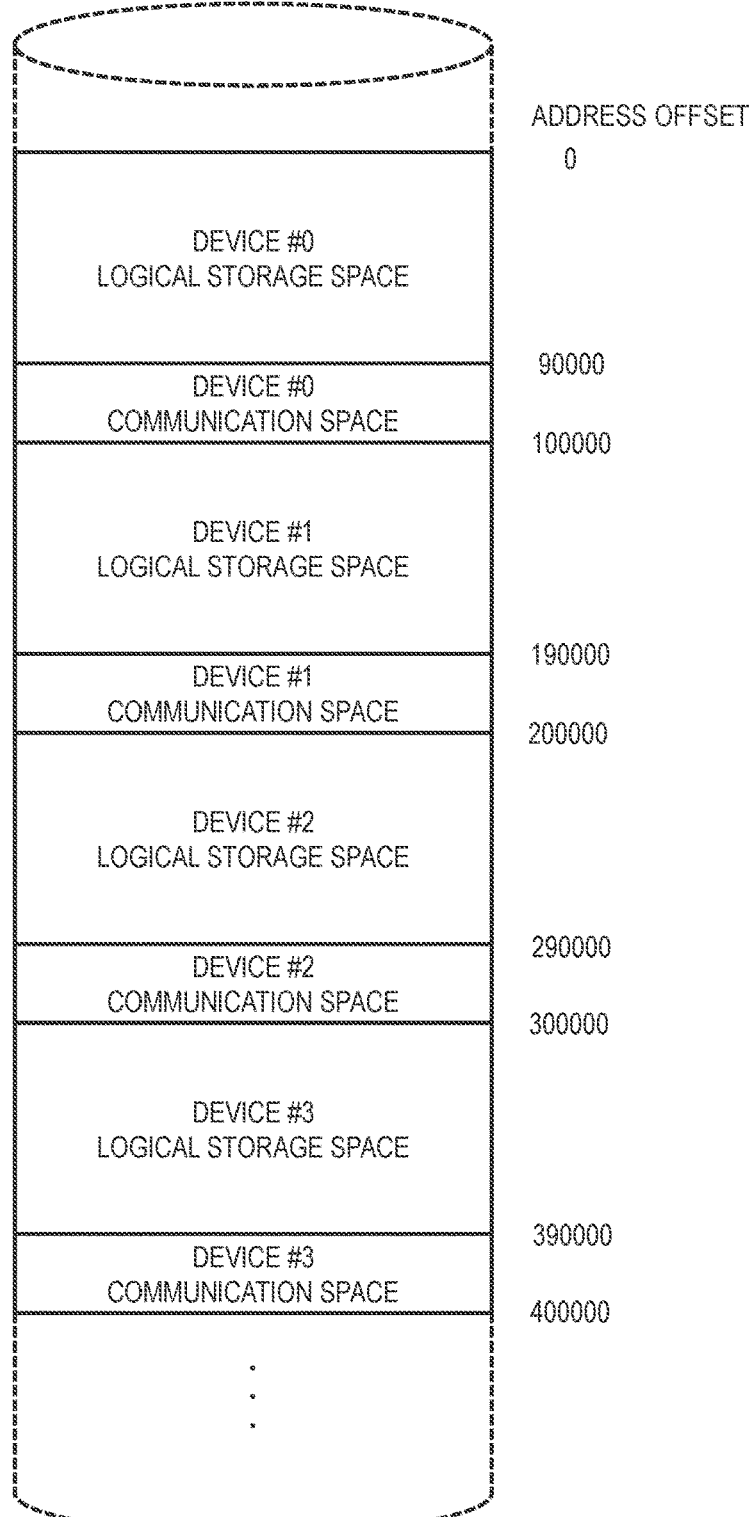
FIG. 8 is a diagram of an address space.

Next, with reference to FIGS. 7 to 9, the logical configuration of a system and the configuration of data arrangement according to this embodiment is described. RAID is applied to the storage system of this embodiment. In the following, a case is described as an example where RAID 5 with 3 Data+1 Parity is applied to the system configuration 1 and the storage devices 31 to 34 constitute one RAID group. It should be noted that this embodiment describes the configuration to create one parity block for three data blocks stored in three different storage devices, respectively; however, the present invention is not limited to this embodiment. The system may create one parity block for five data blocks stored in five different storage devices, respectively. The system may create three parity blocks for three data blocks stored in three different storage devices, respectively, in one RAID group. Further, there may be two or more RAID groups.

FIG. 7 depicts the relationship between a logical volume 50 and a RAID group according to this embodiment. The storage controller 200 provides the host computer 10 with the logical volume 50 as a data storage area. The storage controller 200 may provide a plurality of logical volumes to the host computer 10.

The logical volume 50 is divided into storage areas referred to as logical blocks to be managed. Each logical block is assigned an LBA to be identified. The host computer 10 can access to any storage area by specifying the identification number and the storage LBA of the logical volume. The logical storage spaces 51 to 54 provided to the storage controller 200 by the storage devices 31 to 34 are also each divided into a plurality of logical blocks. Hereinafter, the LBA of the logical volume 50 provided by the storage controller 200 is referred to as storage LBA. As described above, the LBA of each of the logical storage spaces 51 to 54 of the storage devices 31 to 34 is referred to as device LBA. Logical blocks in the logical volume 50 are associated with logical blocks in the logical storage spaces 51 to 54. The storage controller 200 identifies the storage device and the device LBA from a storage LBA designated by the host computer 10, and accesses the storage device.

Logical blocks allocated consecutive LBAs within the logical volume 50 are allocated dispersedly to the logical storage spaces 51 to 54. In the 3 Data+1 Parity configuration, parity of one logical block is created for data of three consecutive logical blocks, and the four logic blocks constitute a stripe. For example, Stripe 0 consists of Data 0, Data 1, Data 2 and Parity 0 created by a bitwise XOR operation of 16 KB Data 0, Data 1 and Data 2.

In this embodiment, the storage LBA is managed in 16 KB units, thus Data 0, Data 1, . . . are all 16 KB data. In addition, the device numbers of the storage devices 31 to 34 are #0, #1, #2, #3, respectively for identification of the storage devices in the RAID group in the following example. A device # in the RAID group and a device internal address corresponding to a storage LBA can be defined uniquely by the following calculation using the value of the storage LBA. Specifically, the device # is the remainder obtained by dividing the value of the storage LBA by the number of devices of the RAID group, which is 4. The device internal address can be determined by dividing the value of the storage LBA (rounded down) by the number of logical blocks of the data in the stripe, which is 3.

Next is described an example of writing the write data of the host computer 10 to the storage LBA "6" of the logical volume 50. In this case, the device # is 2 of the remainder of 6/4, and the device internal address is 2 rounded down from 6/3. These values are calculated uniquely from the number of devices of the RAID group and the number of logical blocks of the data of the stripe.

Further, the parity is calculated on the basis of the data belonging to the same stripe. When any one of the logical blocks of the data in the same stripe is updated, the parity is also updated. For example, When Parity 0 is calculated by an XOR operation of Data 0, Data 1 and Data 2, new parity is calculated by an XOR operation of old data (Data 6), new data (Write data), and old parity (Parity 0). The details of the parity update will be described later.

FIG. 8 depicts an example of a PCIe bus address space. The address map is created in the following manner. First, upon initialization of the storage devices or when the storage controller 200 recognizes a new storage device, the storage controller 200 inquires of each storage device what address space is configured. Each storage device responds the range of the address space (device internal address), the size of the logical storage space, and the size of the space for communication to the storage controller 200. The storage controller 200 sets the address offset to identify each storage device on the logical storage space to create the address map by using the response result. Then, the storage controller 200 sets the address map on the root complex (I/O interface 250) of PCIe and the switch 280. For example, the address map is stored in a memory in the switch 280. Thus, it is possible for the storage apparatus with a plurality of storage devices to identify uniquely the address of each storage device, and the switch 280 is able to route a packet to the corresponding address.

In FIG. 8, the address offsets of the logical storage spaces of the device #0 to the device #3 are "0", "100000", "200000" and "300000", respectively. The address offsets of the communication spaces of the device #0 to the device #3 are "90000", "190000", "290000" and "390000", respectively. The communication spaces are mapped to some or all of the registers of the processor 311 and the data buffer 313 of the respective storage devices 31 to 34. The address of this communication space allows exchanging control information with the storage controller 200 and storing data read from another recording device.

FIG. 9 depicts an example of RAID management information 810. The RAID management information 810 is stored in the memory 82 of the storage apparatus 20. The storage controller refers to the RAID management information 810 to access the storage devices.

The RAID Group #811 is information for identifying each RAID group uniquely in the storage apparatus 20. RAID level 812 indicates the RAID control scheme for each RAID group. Examples of the RAID level are RAID 1, RAID 5, RAID 6, RAID 10 and the like. RAID configuration 813 indicates the number of logical data blocks of data and the number of logical data blocks of parity in a stripe in each RAID group. For example, when three storage devices store data and one store device store parity for one RAID stripe, the RAID configuration is expressed as "3D1P". Stripe size 814 indicates the size of a logical data block of data and parity in a stripe. Device #815 is information for identifying each device in each RAID group. Device offset 816 indicates, in the case of using a plurality of storage devices as a single logical storage space, the address start position of each storage device in each logical address space. Device size 817 indicates the size of the logical storage space of each storage device, the address space of the device size 817 from the device offset 816 is the accessible logical storage space of each storage device.

The storage controller 100 cannot distinguish storage devices only by device LBA. Thus, setting the address offset for each device # and using a value obtained by adding a device LBA to an address offset, the storage controller 100 can access uniquely a storage area of any one of the storage devices 31 to 34 connected with the PCIe bus.

The present invention, at initialization or upon recognizing a new device, notifies all of the storage devices in the RAID group of RAID management information 810 including the information of the storage devices in the RAID group and the communication space information required to exchange read/write commands. In this embodiment, the communication space information indicates the address of the communication space of each storage device. Thus, each storage device is able to access the other storage devices in the RAID group.

In this embodiment, the RAID management information 810 described as an example includes the RAID group #811, the RAID level 812, the RAID configuration 813, the stripe size 814, the device #815, the device offset 816, and the device size 817. The RAID configuration information is not limited to the above information. The RAID configuration information may include any information for a storage device to instruct another storage device to transfer data for parity update. For example, the storage controller 100 may notify the device start the address and the device end address instead of the device offset 816 and the device size 817, or notify the device address identifying the device and the device size as described later in an example using a SAS bus. In this embodiment, a pair of the device offset 816 and the device size 817, a pair of the device start address and the device end address, a pair of the device address and the device size each are information for uniquely identifying each storage area of a plurality of storage devices, and referred as storage device identification information.

FIG. 10 depicts an example of lock management information 910. The lock management information 910 includes information on relationships between processes executed by the processor 210 and lock states. The lock means that an access (e.g., read or write) to the target region of the lock is blocked from any other process than the process holding the lock. The specific information included in the lock management information 910 is as follows.

Process #911 indicates the identification number of each process that the processor 210 is executing or planned to execute in the future. Before the processor 210 starts a process, the processor 210 searches the lock management information 910 to find a free process # and records the process type, the lock state and so on in the columns corresponding to the process #. Upon completion of the process, the processor 210 deletes the entry corresponding to the process.

Process type 912 indicates the type of each process such as writing and reading. RAID group #913 indicates the identification number of the target RAID group of each process. Device #914 indicates the identification number of the target device of the RAID group of each process. Device LBA 915 indicates the device LBA of the target storage device of each process.

Lock state 916 indicates whether each process has acquired a lock and indicates the target of the lock. "Stripe lock" means to prohibit access by another process to the stripe corresponding to the target device LBA until the execution of the process for the target device LBA is completed. When the process holding the lock is completed, the lock is released. In this embodiment locks the entire stripe for updating data in the stripe. This is to guarantee the order of updating the data and updating the parity accompanying the data update. When a read or write process occurs in a stripe during a process of updating the data and parity in the stripe by a certain write process, it cannot be determined whether the process is executed for the data before or after the update, resulting in a possibility of inconsistency. Therefore, holding the lock guarantees the process order and prevents an occurrence of inconsistency. A lock is unnecessary for reading because no data update occurs.

Next, a parity update process in a random write in the system configuration 1 is explained. In this embodiment, a case where the ratio of the number of logical blocks to be updated is less than a predetermined value to a plurality of consecutive logical blocks in one stripe is referred to as a random write, and a case where the ratio is more than the predetermined value is referred to as a sequential write. In the first embodiment, the parity update process in the random write is described, and the parity update process in the sequential write is described in the fourth embodiment.

It will be explained why different processes are executed for a random write and a sequential write, respectively. For example, when the storage controller receives new Data 0 for one logical block, the storage controller is able to create new Parity 0 using old Data 0 and old Parity 0 as shown in FIG. 1. When the storage controller receives write data (total 48 KB of new Data 0, new Data 1 and new Data 2) for updating consecutive logical blocks in the stripe, the storage controller is able to create the new parity by an XOR operation of these three logical blocks of the new data. In this case, it is more efficient to create new Parity 0 from new Data 0 to new Data 2 than applying the process illustrated in FIG. 1 to each of new Data 0 to new Data 2. Therefore, an appropriate parity update process is selected.

For example, when the storage controller receives total 32 KB data of new Data 0 and new Data 1, the storage controller may apply sequentially the parity update process for a random write to to new Data 0 and new Data 1. In a case where the storage controller receives total 40 KB of new Data 0, new Data 1, and new Data 2' for updating the first half of old Data 2, it may be more efficient in some cases to read the second half of old Data 2 and perform the parity update for a sequential write. The conditions whether the update process for a random write is performed or the update process for a sequential write is performed may be appropriately set depending on the stripe size.

Figure 11:
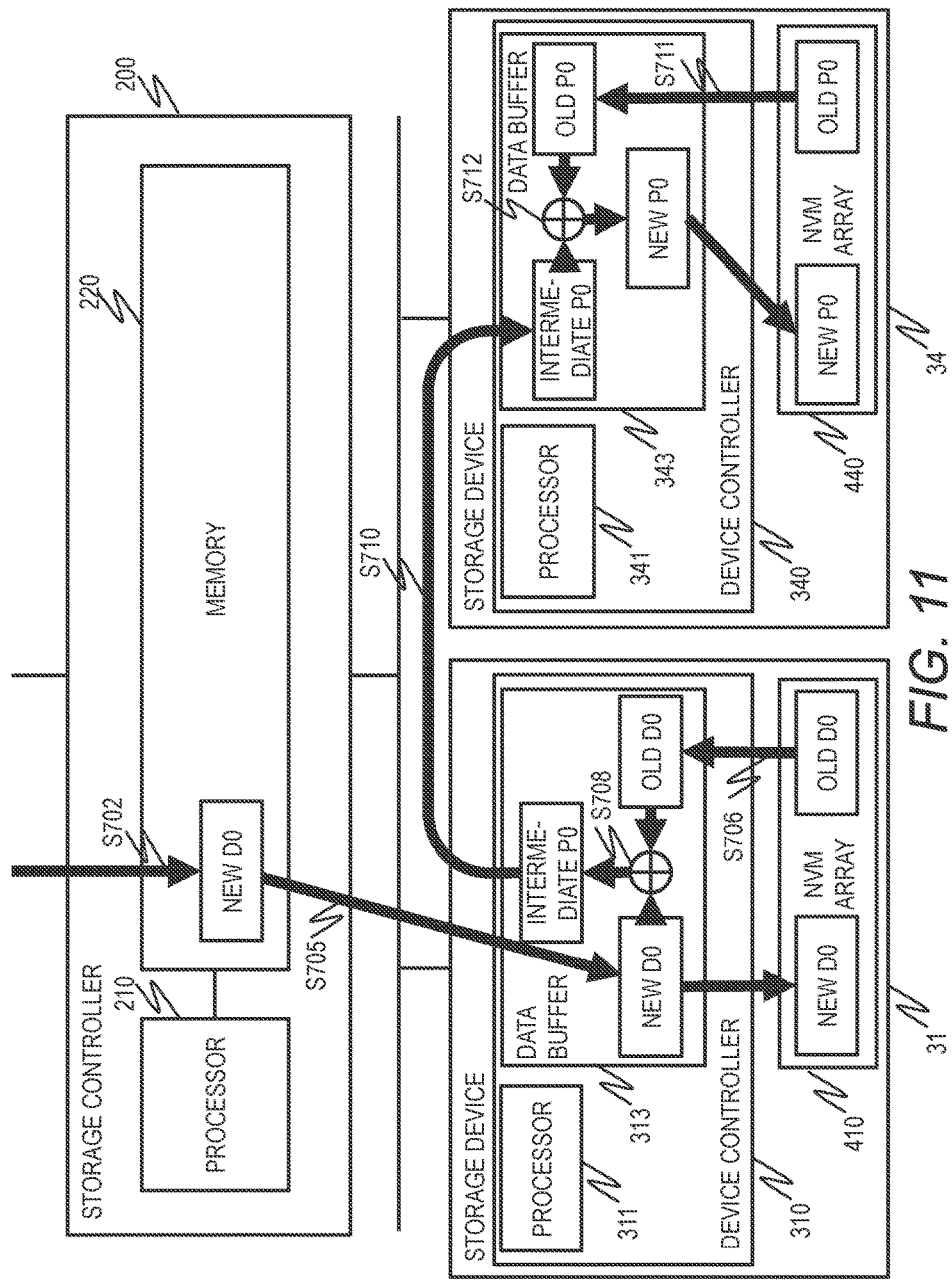
FIG. 11 is a diagram of a ladder chart depicting an operation according to the first embodiment.
Figure 12B:
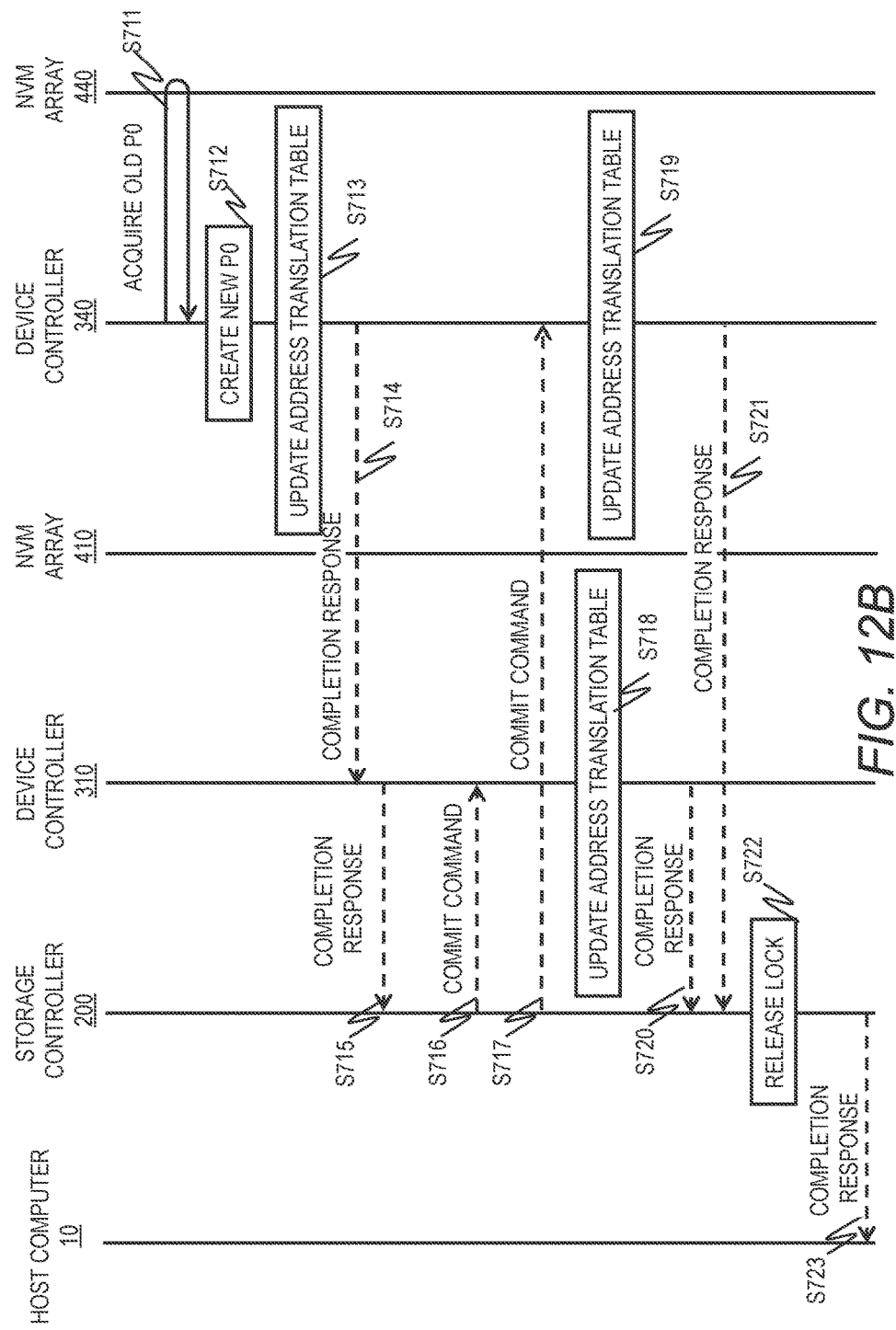
FIG. 12B is a diagram of the ladder chart depicting the operation according to the first embodiment.

FIG. 11 depicts data flow among the devices in the write process. In addition, FIGS. 12A and 12B depict a ladder chart of the write process accompanied by parity update.

An operation for a write command transferred from the host computer 10 to the storage apparatus 20 for updating old Data 0 to new Data 0 will be described. As shown in FIG. 11, old Data 0 before update is stored in the storage device 31, and old Parity 0 belonging to the same stripe 0 as old Data 0 is stored in the storage device 34. The old Parity 0 is updated to new Parity 0 as old Data 0 is updated.

In step S701, the host computer 10 transfers a write command to the storage apparatus 20. Specifically, first, the host computer 10 creates new Data 0 and the write command in the memory. The write command includes the storage LBA indicating the logical block to which new Data 0 is to be written and information indicating the storage location of new Data 0 in the memory in the host computer 10 (for example, the address of the memory in the host computer 10). Next, the host computer 10 notifies the storage apparatus 20 that the new write command has been created. For example, the host computer 10 notifies the creation of the command by incrementing a value in a specific area in the memory 220. Upon receiving the notification, the processor 210 of the storage controller 200 instructs the host interface 240 to transfer the newly created write command to the memory 220. It should be noted that the transfer of the write command may be executed by the host computer serving as the master without notifying the storage apparatus 20.

In step S702, the storage controller 200 acquires new Data 0 from the host computer 10. Specifically, within the storage controller 200, the processor 210 issues an instruction to the host interface 240 to transfer the new data from the memory of the host computer 10 specified by the write command to the memory 220. It should be noted that the transfer of new Data 0 may be performed by the host computer 10 serving as the master. Upon acquiring new Data 0, the storage controller 200 may transmit a completion response to the write command to the host computer 10. In this case, the subsequent process is executed asynchronously with the write command.

In step S703, the storage controller 200 acquires the lock for the stripe 0 to which new Data 0 belongs. Specifically, first, the processor 210 identifies the storage device 31 and the device LBA as the write destination of new Data 0 from the storage LBA designated by the acquired write command based on the RAID management information 810. Then, the processor 210 refers to the lock management information 910 stored in the memory 220 and checks the lock state of the stripe 0 corresponding to the device LBA of new Data 0. When the stripe 0 is already locked, the processor 210 suspends the process until the lock is released. When the lock for the stripe is released, the processor 210 acquires the lock for the stripe 0 by updating the lock management information 910 in the memory 220.

Next, the processor 210 determines whether to perform a parity update as either a random write or a sequential write. In this embodiment, since new Data 0 of one logical block is received, it is determined to update the parity as a random write. In step S704, the storage controller 200 transfers a parity write command to the storage device 31. Specifically, the processor 210 creates the parity write command in the memory 220. The parity write command is a command to instruct writing of new Data 0 and updating of the parity associated with new Data 0. The parity write command includes address information indicating the write destination device LBA of new Data 0 and the storage location of new Data 0 in the memory 220. In this embodiment, since the RAID management information 810 is distributed to each of the storage devices 31 to 34 in advance, there is no need to include parity storage location information in the parity write command. Therefore, the load on the processor 210 due to creation of the parity write command is reduced. In a case where the RAID management information 810 is not distributed to the storage devices in advance, the processor 210 includes the device LBA of the storage device in which old Parity 0 is stored in the parity write command. Thereby, each storage device does not need to store the RAID management information 810 in the memory 312, and the capacity of the memory 312 can be reduced.

After creating the parity write command, the processor 210 instructs the I/O interface 250 to notify the storage device 31 of the creation of the command to. In the notified storage device 31, the processor 311 instructs the I/O interface 315 to transfer the parity write command in the memory 220 to the data buffer 313. The transfer of the parity write command may be performed by the storage device 31 serving as the master.

In step S705, the device controller 310 acquires new Data 0 from the storage controller 200. Specifically, the processor 311 of the device controller 310 analyzes the acquired parity write command and locates the area (address) of the memory 220 of the storage controller 200 in which new Data 0 is stored. Next, the processor 311 of the device controller 310 issues an instruction to the I/O interface 315 to transfer new Data 0 from the area of the memory 220 specified by the parity write command to the data buffer 313. The transfer of new Data 0 may be performed by the storage controller 200 serving as the master.

In step S706, the device controller 310 reads old Data 0 from the NVM array 410. Specifically, the processor 311 of the device controller 310 refers to the address translation table 610 and identifies the PBA of the physical area in which old Data 0 is stored from the device LBA specified by the parity write command. Within the device controller, the processor 311 instructs the NVM interface 316 to read old Data 0 from the page of the NVM chip 411 in the NVM array 410 based on the identified PBA and store it in the data buffer 313.

In step S707, the device controller 310 updates the address translation table 610 for managing the storage location of new Data 0 and maintains both new Data 0 and the old data in a readable state by one of the following two processes. Even after receiving new Data 0, the device controller 310 maintains the PBA storing the old data in the address translation table 610 without updating it. When the device controller 310 receives a commit command to be described later, the device controller 310 sets the old data to be discarded. This is a process for improving the reliability of the storage device in preparation for occurrence of an error.

In the first process, the processor 311 of the device controller 310 stores the address of the data buffer 313 storing new Data 0 in the update information 613 in association with the device LBA in the address translation table 610. Thereby, the intermediate parity can be created without writing new Data 0 to the NVM array, allowing the time up to the completion of the parity update to be shortened and the performance to be improved.

In the second process, the device controller 310 writes new Data 0 to the NVM array 410. More specifically, the processor 311 selects a free page to which new Data 0 is to be written, and stores the PBA of the free page in the update information 613 in association with the device LBA in the address translation table 610. The processor 311 issues an instruction to the NVM interface 316 based on the selected PBA to write new Data 0 to the NVM chip 411 in the NVM array 410. Since new Data 0 is stored in the NVM array, which is nonvolatile memory, there is an effect that new Data 0 does not disappear even if a sudden power supply failure occurs during the parity update process. In step S708, the device controller 310 creates the intermediate Parity 0 based on old Data 0 and new Data 0. Specifically, in the device controller, the processor 311 instructs the parity calculation unit 314 to read old Data 0 and new Data 0 on the data buffer 313, execute the parity operation, and store the result as the intermediate Parity 0 in the buffer 313.

In step S709, the device controller 310 transfers a parity update command to the device controller 340. The parity update command is a command instructing creation of new parity based on intermediate parity and old parity. More specifically, first, the processor 311 of the device controller 310 creates a parity update command on the data buffer 313. The processor 311 refers to the RAID management information 810 to identify the device LBA of the storage device in which old Parity 0 is stored and includes the identified device LBA in the parity update command. In addition, the processor 311 includes the address in the data buffer 313 in which the intermediate Parity 0 created in step S708 is stored and the address in the data buffer 313 in which the parity update command is stored, in the parity update command. Then, the processor 311 instructs the I/O interface 315 to notify the storage device 34 of the creation of the parity update command. In the notified storage device 34, the processor 341 instructs the I/O interface 345 to transfer the parity update command on the data buffer 313 of the storage device 31 to the data buffer 343 of the storage device 34. The transfer of the parity update command may be performed by the device controller 310 serving as the master. In a case where the parity write command includes the device LBA of the storage device in which old Parity 0 is stored, the processor 311 may include the device LBA in the parity update command.

When the device controller 310 has not received the completion response to the parity update command even after a lapse of a predetermined time, the device controller 310 notifies the occurrence of a Timeout error to the storage controller 200. How to handle an error which has occurred will be described later.

In step S710, the device controller 340 acquires the intermediate Parity 0 from the device controller 310. Specifically, in the device controller 340, the processor 341 causes the I/O interface 345 to transfer the intermediate Parity 0 from the address in the data buffer 313 specified by the parity update command to the data buffer 313. The transfer of the intermediate Parity 0 may be performed by the storage device 31 serving as the master.

In step S711, the device controller 340 reads old Parity 0 from the NVM array 440. Specifically, in the device controller, the processor 341 refers to the address translation table 610 to identify the PBA in which the old parity is stored from the device LBA included in the parity update command, issues an instruction to the NVM interface 346 to read old Parity 0 from the NVM chip 441 in the NVM array 440 based on the PBA in which the old parity is stored and store it in the data buffer 343.

In step S712, the device controller creates new Parity 0 based on old Parity 0 and the intermediate Parity 0. Specifically, in the device controller, the processor 341 issues an instruction to the parity calculation unit 344 to read old Parity 0 and the intermediate Parity 0 on the data buffer 343, execute the parity operation, and tore the result as new Parity 0 in the data buffer 343.

In step S713, the device controller 340 maintains new Parity 0 and old Parity 0 in a readable state by one of the following two processes even after the creation of new Parity 0. This is the same as the device controller 310 managing new Data 0 and old Data 0 in step S707.

In the first process, the processor 341 of the device controller 340 stores the address in the data buffer 343 storing new Parity 0 in the update information 613 in association with the device LBA in the address translation table 610. Thereby, the completion response in S712 is transmitted without writing new Parity 0 to the NVM array, allowing the time up to the completion of the parity update to be shortened and the performance to be improved.

In the second process, the device controller 340 writes new Parity 0 to the NVM array 410. Specifically, the processor 341 selects a free page to which new Data 0 is to be written, and stores the PBA of the free page in the update information 613 in association with the device LBA in the address translation table 610. The processor 341 issues an instruction to the NVM interface 346 based on the selected PBA to write new Parity 0 to the NVM chip 441 in the NVM array 440.

In step S714, the device controller 340 transfers a completion response to the parity update command to the device controller 310. Specifically, first, in the device controller 340, the processor 341 creates the completion response to the parity update command on the data buffer 343. Next, the processor 341 issues an instruction to the I/O interface 345 to transfer the created completion response to the data buffer 313 in the storage device 31. It should be noted that the processor 341 may notify the storage device 31 of the creation of the completion response, and the storage device 31 serving as the master may transfer the completion response.

The device controller 340 may transmit the pre-acquisition completion response of old Parity 0 after acquiring the intermediate Parity 0. In this case, the device controller 340 acquires old Parity 0 from the NVM array and creates new Parity 0 after transmitting the completion response. As a result, the time until the parity update is completed is further shortened.

In step S715, the device controller 310 transfers a completion response to the parity write command to the storage controller 200 in response to reception of the completion response to the parity update command from the device controller 340. Specifically, first, the processor 311 in the device controller 310 creates the completion response to the parity write command on the data buffer 313. Next, the processor 311 issues an instruction to the I/O interface 315 to transfer the created completion response to the memory 220 in the storage controller 200. It should be noted that the processor 311 may notify the storage controller 200 of the creation of the completion response, and the storage controller 200 serving as the master may transfer the completion response.

In steps S716 and S717, the storage controller 200 transfers a commit command for incorporating the data update to each of the storage devices 31 and 34 in response to reception of the completion response to the parity write command from the device controller 310. Here, steps S716, 718 and 720 will be described, taking a commit command for new Data 0 to the storage device 31 as an example.

In step S716, upon receiving the completion response to the parity write command from the storage device 31, the processor 210 creates a commit command to the storage device 31 in the memory 220. The commit command is a command for notifying the completion of the parity update process. The commit command can be regarded as a command for discarding old Data 0 and fixing new Data 0. The commit command includes the device LBA indicating the storage destination of new Data 0 in the storage device 31. After creating the commit command, the processor 210 instructs the I/O interface 250 to notify the storage device 31 of the creation of the command. Upon receiving the notification, the storage device 31 instructs the I/O interface 315 to transfer the commit command in the memory 220 to the data buffer 313. The transfer of the commit command may be performed by the storage controller 200 as serving the master. In step S 718, upon receiving the commit command, the device controller 310 updates the address translation table 610. Specifically, the processor 311 in the device controller 310 selects a page for storing new Data 0 stored in the data buffer 313, and stores the PBA of the page in the PBA 612 of the address translation table 610 for associating the PBA with the device LBA of new Data 0. Then, the processor 311 deletes the information in the update information 613 of the address translation table 610. Then, the processor 311 stores new Data 0 in the page of the selected PBA. The storage device 31 returns old Data 0 to a read access to the device LBA before step S718 is executed; however, after step S718 is executed, the processor 311 returns new Data 0 in response to a read access to the same device LBA. The device controller 310 can discard old Data 0 upon receiving the commit command. Actually the device controller 310 deletes old Data 0 asynchronously with the reception of the commit command.

When new Data 0 is already stored in the NVM array 410, the processor 311 copies the value of the PBA stored in the update information 613 to the column of the PBA 612, and deletes the information in the update information 613.

In step S720, the device controller 310 returns a completion response to the commit command to the storage controller 200. Specifically, first, the processor 311 of the device controller 310 creates the completion response to the commit command on the data buffer 313. Next, the processor 311 issues an instruction to the I/O interface 315 to transfer the created completion response to the memory 220 in the storage controller 200. It should be noted that the processor 311 may notify the storage controller 200 of the creation of the completion response, and the storage controller 200 serving as the master may transfer the completion response.

Steps S717, S719, and S721 are similarly performed for the storage device 34 storing new Parity 0 for incorporating the update to new Parity 0. The explanation can be made by replacing the storage device 31 of steps S716, S718, and S720 with the storage device 34, and replacing new Data 0 with new Parity 0, hence the details are omitted.

Upon receiving the completion response to the commit command from each of the storage device 31 storing the new data and the storage device 34 storing the new parity, the storage controller 200 executes step S722.

In step S722, the storage controller 200 releases the lock on the stripe 510. In the storage controller 200, the processor 210 deletes the information in the lock management information 910 in the memory 220, thereby releasing the lock on the stripe 0.

In step S723, the storage controller 200 returns a completion response to the write command to the host computer 10. First, in the storage controller 200, the processor 210 creates the completion response to the write command in the memory 220. Next, the processor 210 issues an instruction to the host interface 240 to transfer the created completion response to the memory in the host computer 10. The processor 210 may notify the host computer 10 of the creation of the completion response and the host computer 10 serving as the master may transfer the completion response.

The above describes process is capable of recusing the number of data transfers between the storage controller and the storage device for updating the parity to one, reduce the transfer load on the storage controller, and speed up the write process.

Here, a restart process for an occurrence of a timeout error will be described. When the device controller 310 does not receive the completion response to the parity update command even after a lapse of a predetermined time, the device controller 310 notifies the occurrence of the timeout error to the storage controller 200. Upon receiving this notification, the storage controller 200 instructs the management computer 15 to display on the management screen that a timeout has occurred between the storage device 31 as the transfer source and the storage device 34 as the transfer destination. In addition, the storage controller 200 resumes the process from step S704 for transmitting the parity write command to the storage device 31. The storage controller 200 cannot recognize the progress state of the process until receiving the completion response to the parity write command in step 715 described later. Therefore, the process resumes from step S704 in response to an occurrence of a timeout or another error.

Since old Data 0 is managed in the readable state in the storage device 31 as described in step S707, when the device controller 310 receives the parity write command, the device controller 310 can acquire old Data 0 in step S706. When the PBA indicating the storage location of old Data 0 has been updated to the information indicating the storage location of new Data 0, old Data 0 is lost and the process cannot be resumed in this way. The device controller 310 creates the intermediate parity in step S708, and transmits the parity update command to the storage device 34 in step S709. Since old Parity 0 is also managed in the readable state in the storage device 34, it is possible to read old Parity 0 in step S711.

As described above, the old data and the old parity is maintained readable for the timeout error and other troubles until the storage controller recognizes the completion of the parity update and transmits the commit command, thereby improving the reliability of the storage apparatus.

FIGS. 13A and 13B depict a configuration example of the management screen 1400 displayed on the storage apparatus 20 or the management computer 15 of the server 80. This embodiment provides an administrator with information regarding the offload function usage status of the storage devices 31 to 34, the state of the communication path between storage devices, and other things via the management image shown in FIGS. 13A and 13B. The management screen 1400 includes an inter-storage device path status table 1410 and an offload function status table 1420.

The inter-storage device path status table 1410 indicates communication states between storage devices. In the example shown in FIG. 13A, the state of each communication path is selected from two states of "in use" and "not used", and shown to a user. The in-use state indicates that the target data path is used in the current settings, and also shows the number of occurrences of timeout. In the example of FIG. 13A, it is found that many timeout errors occurred when the storage device storage device 34 was a transfer destination and some abnormality of the storage device 34 is highly likely to have a defect. The unused state indicates that the path is not used in the current settings.

The user can check the presence/absence of communication on each storage device path and between storage devices and whether there is any abnormality in each path by referring to the inter-storage device path status table. When the timeout frequently occurs, there is a possibility that an abnormality has occurred in the communication path or storage device. In this way, the occurrence status of the timeout of the communication between the storage devices displayed on the management image allows the administrator to grasp the occurrence state of the abnormality and facilitates the maintenance management for maintaining the reliability of the system.

The offload function status table 1420 indicates the status of offload functions such as a parity update function and a duplicate write function for each storage device. For example, the offload function status table 1420 in FIG. 13B shows three states of in-use, non-use, and non-supported for the offload functions such as the parity update function and the duplicate write function for each storage device. The in-use state indicates that the storage device supports the target offload function and is currently included in a RAID group, and the process is to be offloaded. The non-used state indicates that the storage device supports the target offload function; however, the processing cannot be offloaded for some reason, for example, due to the fact that the storage device is not currently included in a RAID group. The non-supported state indicates that the storage device does not support the target offload function. The user can check the usage states of the offload functions and an existence of an offload function non-supporting storage device by referring to the offload function status table 1420.

The operation of the first embodiment is described above. FIGS. 11, 12A and 12B depicts an example that the storage controller transfers the new data to the storage device which stores the old data, and after the storage device which stores the old data creates the intermediate parity, the storage device which stores the old data instructs the storage device which stores the parity to update the parity. Alternatively, the storage controller may transfer the new data to the storage device which stores the old parity, the storage device which stores the old parity acquires the old data from the storage device which stores the old data, and after the storage device which stores the old parity updates the parity, the storage device which stores the old parity transfers the new data to the storage device to store the new data.

The first embodiment describes the operation in the storage device shown in the system configuration 1; however, the present invention is not limited to this configuration. The present invention may be applied to any configuration including a plurality of storage devices and a host device which manages the storage devices. For example, the present invention may be applied to the system configuration 2. In this case, the storage apparatus 20 is replaced with the server 80.

As described above, in the update process of parity for a random write, it is unnecessary for the storage controller to acquire the old data, the old parity, and the intermediate parity from the storage devices for updating the the parity. Further, the parity creation by the storage controller is not required. Therefore, the I/O processing load and the data transfer load on the storage controller are reduced. In addition, the concentration of data transfer load on the bus in the storage controller is solved. The storage controller is prevented from becoming a bottleneck of performance, the performance of the high-speed storage device can be utilized, and the write process speeds up.

Second Embodiment

The first embodiment describes an example in which, when a host device for storage devices such as a storage controller and a server transfers data to a storage device, a parity update is performed by communication among the storage devices. In the second embodiment to be described below, a case will be explained in which the host device instructs creating new data or updating data in the storage device without data transfer from the host device to the storage device. One example of a system in which new data is created in the storage device is a system in which the host device instructs the storage device to search for data stored in the storage device. In this system, the storage device searches for stored data based on an instruction from the host device and newly creates data of the search result. The search result data is provided to the host device in association with the device LBA provided by the storage device. Here, when the storage device records the search result data in its own area, other storage devices belonging to the RAID group are required to update the area storing the parity data or the duplicate data of the stripe corresponding to the device LBA storing the search result data in another storage device different from the storage device storing the search result data.

The second embodiment describes the parity update operation in the system configuration 2 with respect to data created in the storage device. As in the first embodiment, the storage devices 31 to 34 constitute a RAID 5 group with 3 Data+1 Parity.

As an example, an operation in the case where update of old Data 0 to new Data 0 occurs in the storage device 31 according to an instruction from the host device will be described. In the following example, old Parity 0 of the storage device 34 is updated to new Parity 0 as old Data 0 is updated. Further, the update of the data in the storage device 31 occurs due to storing an off-loaded database processing result into the storage device 31. It should be noted that, in this embodiment, data update occurs due to database processing; however, data may be updated, for example, in association with storing of results of physical simulation. In the following description, the details of the processes described in the first embodiment will be omitted.

Figure 14:
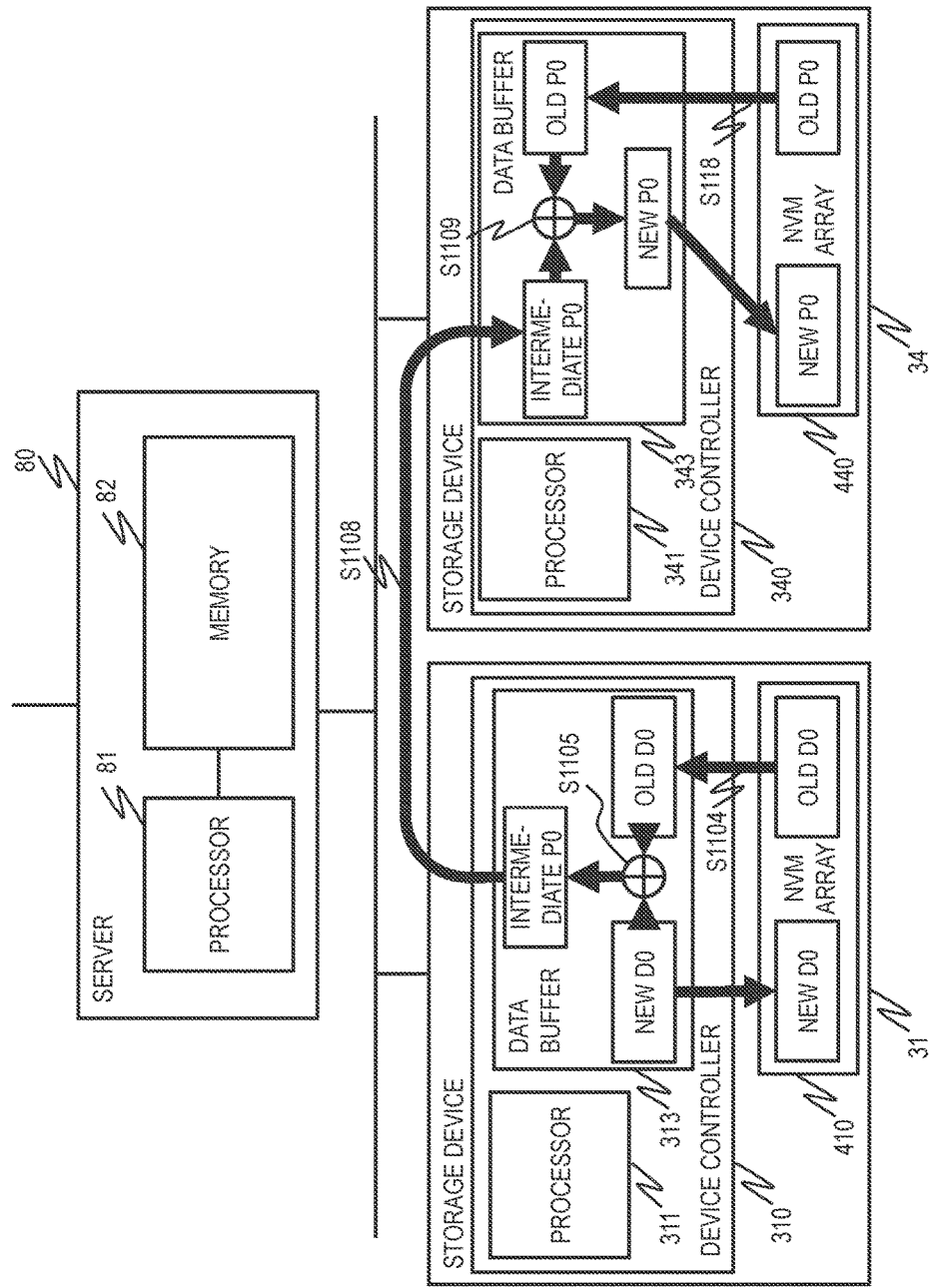
FIG. 14 is a diagram data flows according to the second embodiment.
Figure 15:
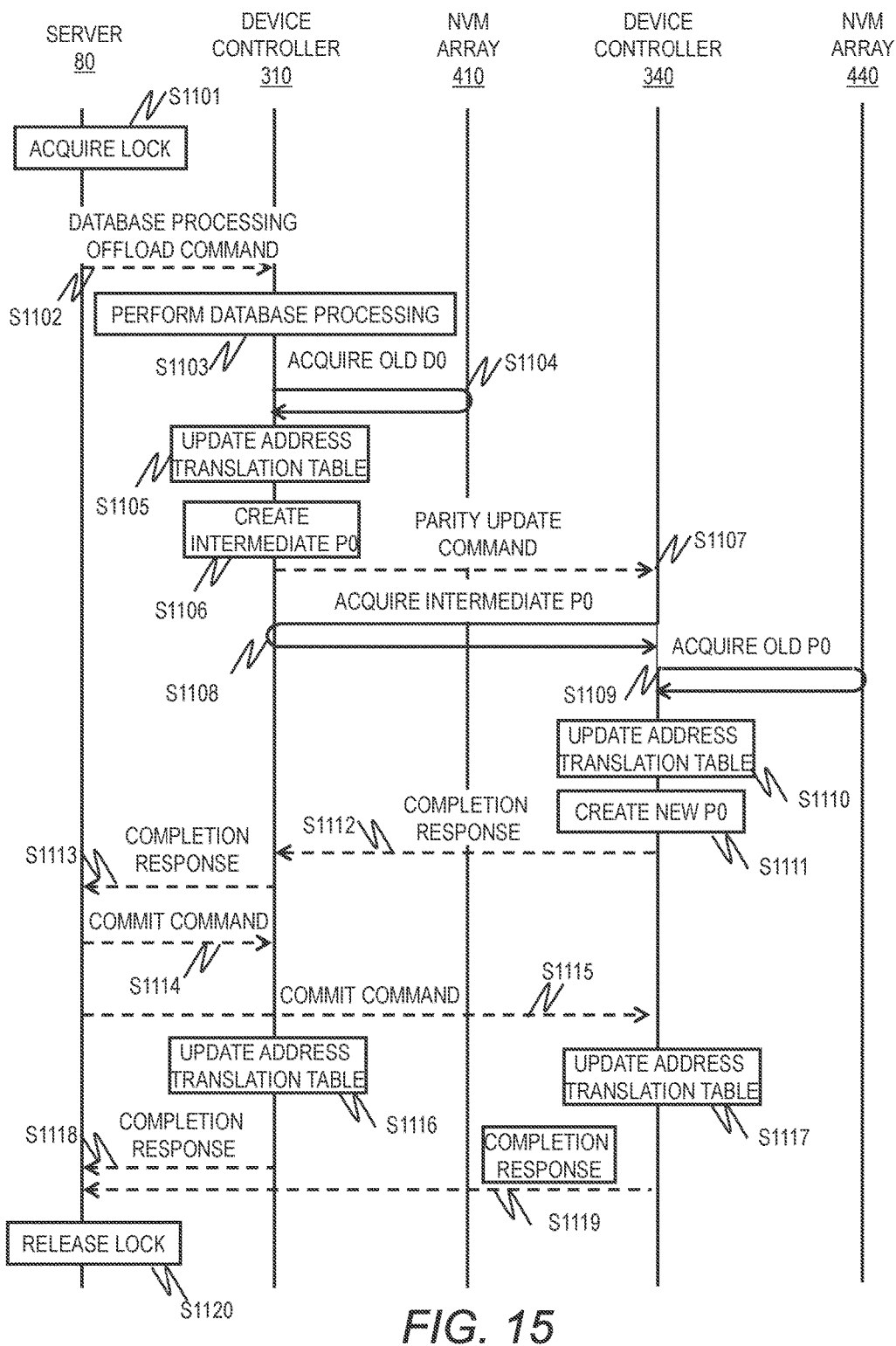
FIG. 15 is a diagram of a ladder chart depicting an operation according to the second embodiment.

FIG. 14 depicts data flows between the devices as to operations including update of data due to database processing from the server 80 to the storage device 31. FIG. 15 depicts a ladder chart illustrating the parity update process accompanying the database processing.

In step S1101, the server 80 acquires beforehand the lock of the stripe 0 to which the device LBA to be the data write destination of the database processing result belongs. Specifically, first, the processor 81 determines a storage device which stores data to be subjected to database processing, and determines a device LBA for storing data resulting from the database processing in the storage device. After completion of the database processing, the server can access the processing result using this device LBA. Then, the processor 81 refers to the lock management information 910 stored in the memory 82 and checks the lock state of the stripe 0 associated with the device LBA. When the stripe 0 is already locked, the processor 81 suspends the process until the lock is released. When the lock of the stripe 0 is released, the processor 81 acquires the lock of the stripe 0 by updating the lock management information in the memory 82.

In step S1102, the processor 81 transfers a database processing offload command to the device controller 310. Specifically, first, in the server 80, the processor 81 creates the database processing offload command in the memory 82. The database processing offload command includes, for example, information such as the device LBA of the processing target data, the processing result storage destination device LBA, and the contents of the requested database processing. Next, in the server 80, the processor 81 instructs the chipset 84 to notify the storage device 31 of creation of a new command by, for example, incrementing a value in a specific area of the memory 312. In the notified storage device, the processor 311 issues an instruction to the I/O interface 315 to transfer the command created in the memory 82 to the data buffer 313. It should be noted that the transfer of the command may be executed by the server 80 serving as the master.

In step S1103, the storage device 31 performs the instructed database processing. The storage device 31 analyzes the database processing offload command and performs the requested database processing. For example, the processor 311 stores the analysis target data read from the NVM array 310 into the data buffer 313 based on the device LBA specified in the command, and then, executes the database processing and stores the obtained analysis result into the data buffer 313. It should be noted that, in this embodiment, the processing is executed in response to a command; however, the database processing may be executed at predetermined intervals, for example, as a batch processing set in advance. After the database processing is completed, a write occurs for storing new Data 0 obtained as a result of the analysis into the NVM array 410. In this case, new Data 0 is created inside one storage device, thus the parity update process is the same as the process for an occurrence of a random write.

Since steps S1104 to S1112 are similar to steps 706 to 714 of the first embodiment, the description thereof are omitted. Steps S1113 to S1120 are similar to steps S715 to S722 in the first embodiment with the server 80 replacing the storage controller 200, thus the description is omitted.

Parity can be updated by communication among storage devices even when an instruction is issued to a storage device for updating data without transferring data such as a database search instruction and an analysis processing instruction. In addition, since the server does not search or analyze the database, the load on the server is further reduced, and the database search and the analysis processing speeds up.

The foregoing describes the second embodiment. It should be noted that the second embodiment explains the operation in the server shown in the system configuration 2. The present invention is not limited to this embodiment. The present invention can be applied to any configuration including a plurality of storage devices and a host device capable of issuing an instruction accompanying data update without transferring data to the storage device.

Third Embodiment

The first embodiment describes an example in which a plurality of storage devices mutually communicates without the storage controller or the server to update the parity in a example of RAID configuration using parity. However, for suppressing the deterioration of response performance or the like due to parity creation, there is configuration to store the same data in a plurality of storage devices to maintain the redundancy of the data. The third embodiment will describe an example of holding data in a plurality of storage devices. Namely, the same data as the target data of a write request is stored for redundant data in a storage device different from the storage device storing the target data of the write request.

The third embodiment describes an operation for an occurrence of a write request in the data storage configuration to which RAID 1 is applied. The third embodiment describes an example of storage configuration in which a RAID group 600 consists of the storage devices 31 and 32 and data is duplicated in the system configuration 1.

First, the data recording configuration according to the third embodiment will be described. As the example of FIG. 7 to which RAID 5 is applied, logical storage spaces 61 and 62 provided by the respective storage devices 31 and 32 belonging to the RAID group 600 are provided to the host computer 10 as one logical volume 60. It should be noted that storage areas configured in the RAID group 600 may be provided as a plurality of logical volumes to the host computer 10.

Figure 16:
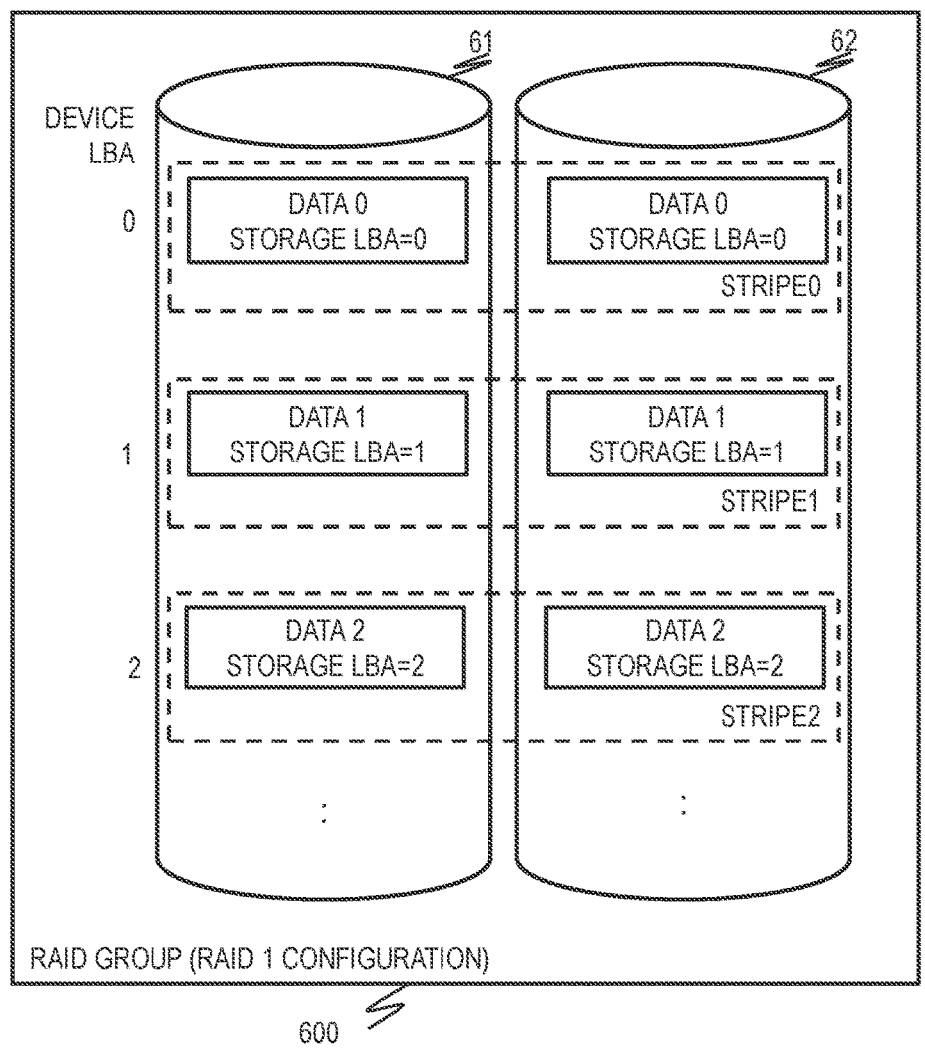
FIG. 16 is a diagram of a data arrangement in RAID 1.

FIG. 16 depicts a data arrangement in the logical storage spaces 61 and 62 in the RAID group 600. In the configuration to which RAID 1 is applied, each logical block in the logical volume 60 is associated with one logical block of each of logical storage spaces 61, 62. For example, data of a logical block with the storage LBA 2 is stored in both the logical block of the device LBA 2 in the logical storage space 61 and the logical block of the device LBA 2 in the logical storage space 62. A stripe is composed of two logical blocks in which the same data is stored.

Since identical data is stored in two logical blocks in RAID 1, it is necessary to update two logical blocks in response to a write request to one piece of data. For example, in response to a write request to the logical block of the storage LBA 2, it is necessary to update the device LBA 2 in the logical storage space 61 of the device LBA 2 in the logical storage space 62.

Next, an updating operation of duplexed data in response to a write command from the host computer 10 in the system configuration 1 to which RAID 1 is applied will be described. An operation for a write command transferred to the storage apparatus 20 for updating old Data 0 to new Data 0 in the storage device 31 will be explained by way of example. As illustrated in FIG. 17, old Data 0 before the update is stored in both the logical storage spaces 61, 62 of the storage devices 31, 32, and the data of both the storage devices 31, 32 is updated with the write of the data.

Figure 18:
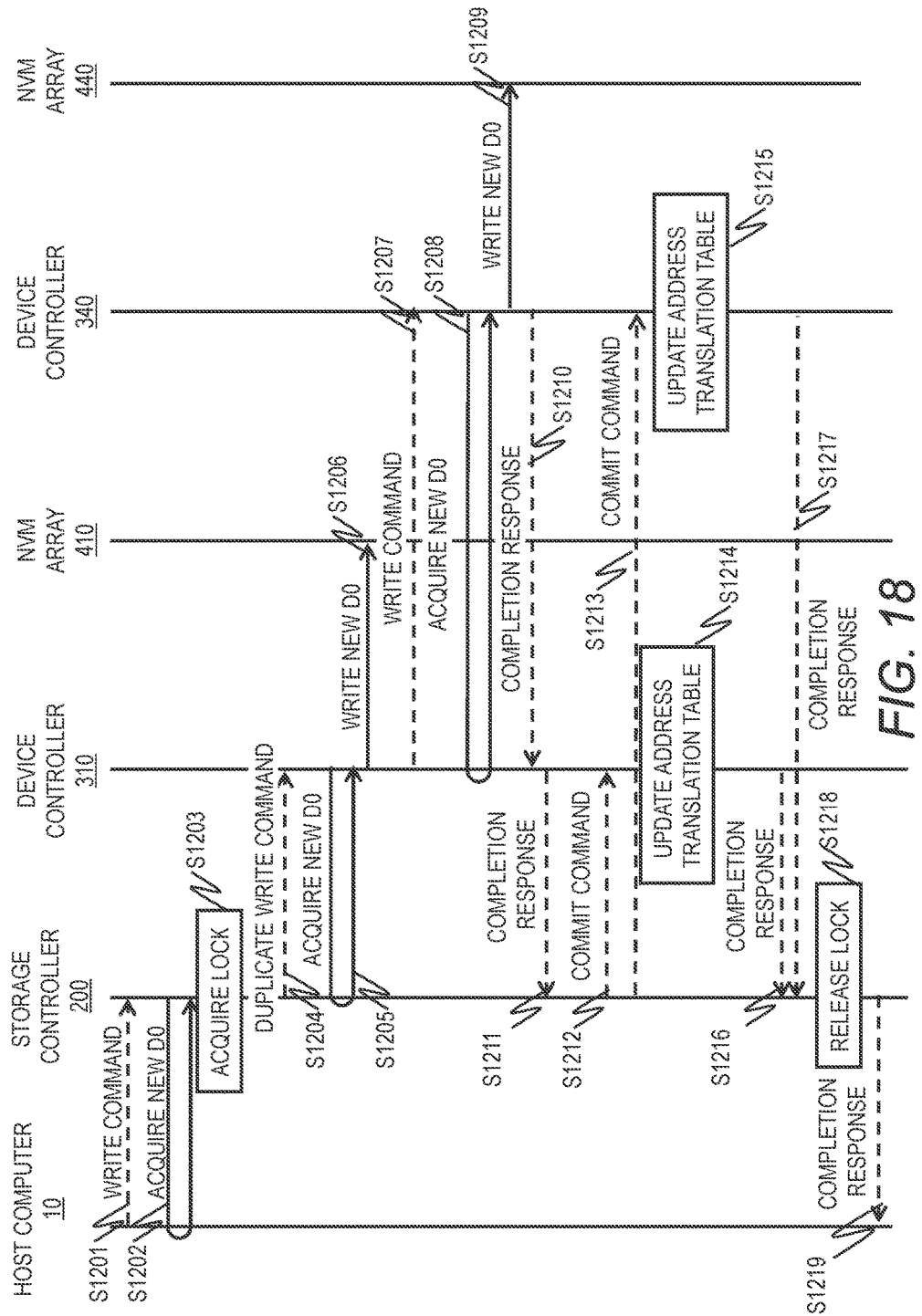
FIG. 18 is a diagram of a ladder chart depicting an operation according to the third embodiment.

FIG. 17 depicts data flows between the devices during execution of a write. FIG. 18 depicts a ladder chart of a process for executing a write. Since steps S1201 to S1203 are similar to steps S701 to 703 of the first embodiment, the description thereof will be omitted.

In step S1204, the storage controller 200 transfers a duplicate write command to the storage device 31. First, the processor 210 identifies the destination storage devices 31, 32 of new Data 0 and the respective storage destination device LBAs from the storage LBA specified by the write command acquired in step S1201. Next, the processor 210 creates a duplicate write command on the memory 220. The duplicate write command includes information of the storage device 32 and the write destination device LBA in the storage device 32 as the write destination information of the duplicate data in addition to the storage location of new Data 0 on the memory 220 and the device LBA of the write destination in the storage device 31. It should be noted that the data storage destination information of data to be duplicated may be distributed as RAID management information to the storage devices 31 and 32 in advance without being included in the duplicate write command. Finally, the processor 210 instructs the I/O interface 250 to notify the storage device 31 of the creation of the duplicate write command. Upon receiving the notification, the processor 311 in the storage device 31 instructs the I/O interface 315 to transfer the duplicate write command on the memory 220 to the data buffer 313.

In step S1205, the device controller 310 acquires new Data 0 from the storage controller 200. In the device controller 310, the processor 311 issues an instruction to the I/O interface 315 to transfer new Data 0 from the area of the memory 220 specified by the duplicate write command to the data buffer 313.

In step S1206, the device controller 310 writes new Data 0 to the NVM array 410. The processor 311 issues an instruction to the NVM interface 316 based on the device LBA included in the duplicate write command to write new Data 0 to the NVM chip 411 in the NVM array 410. There is no restriction on the execution time of step S1205, and the subsequent steps may be performed in advance.

In step S1207, the device controller 310 transfers a write command to the device controller 320. First, in the device controller 310, the processor 311 creates the write command on the data buffer 313. The write command includes the device LBA of the storage destination of the duplicated data and the address of new Data 0 in the data buffer 313 based on the duplicate write write command acquired in step S1203. Then, the device controller 310 transfers the created write command to the device controller 320.

In step S1208, the device controller 320 acquires new Data 0 from the device controller 310. In the device controller 320, the processor 321 causes the I/O interface 325 to transfer new Data 0 from the address of in the data buffer 313 specified by the write command to the data buffer 323.

In step S1209, the device controller 320 writes new Data 0 to the NVM array 420. The processor 321 issues an instruction to the NVM interface 326 based on the device LBA included in the write command to write the new parity 519 to the NVM chip 421 in the NVM array 420. It should be noted that the subsequent steps may be performed before step S1208.

Since steps S1210 to S1219 are similar to steps S714 to S723 of the first embodiment, the description thereof is omitted. The third embodiment is described above. It should be noted that the third embodiment describes the operation of the storage device of the system configuration 1; however, the present invention is not limited to this. The present invention may be applied to any configuration including a plurality of storage devices and a host device which manages them. In addition, although the third embodiment describes the operation using the example in which a write request is generated in the host computer, the write request may be generated in the storage controller or the storage device, for example.

The third embodiment allows the storage controller or the server which manages and uses the RAID group to carry out duplicate writing of data to two devices by only a write instruction to one storage device at the time of updating data in the storage devices. Therefore, the IO process load and the data transfer load on the storage controller are reduced, and the write process speeds up.

Fourth Embodiment

In the first embodiment described above, the parity update process occurring along with a random write is shown. The fourth embodiment described below explains a parity update process occurring along with a sequential write. In an example described below, all the data in a stripe necessary for generating new parity data exists. Parity calculation for a sequential write is efficiently performed by a host device (storage controller or server) which once holds the data in the stripe necessary for computing the parity data. However, when the host device does not have the parity operation function, the parity data cannot be computed. Even if the host device is provided with the parity operation function, the performance may be degraded when the host device is under high load. In such a case, the parity update process according to the fourth embodiment is executed. I should be noted that, since the command transfer process is the same as in the previous embodiments, the detailed description will be omitted as appropriate.

In the fourth embodiment, as in the first embodiment, the storage devices 31 to 34 constitute one RAID 3 group with 3 Data+1 Parity.

As an example, an operation will be described when the host computer 10 transfers a write command, to the storage apparatus 20, for updating old Data 0, 1 and 2 stored respectively in the storage devices 31, 32 and 33 to new Data 0, 1 and 2. The old Parity 0 in the storage device 34 is updated to new Parity 0 along with the update of old Data 0, 1 and 2.

Figure 19:
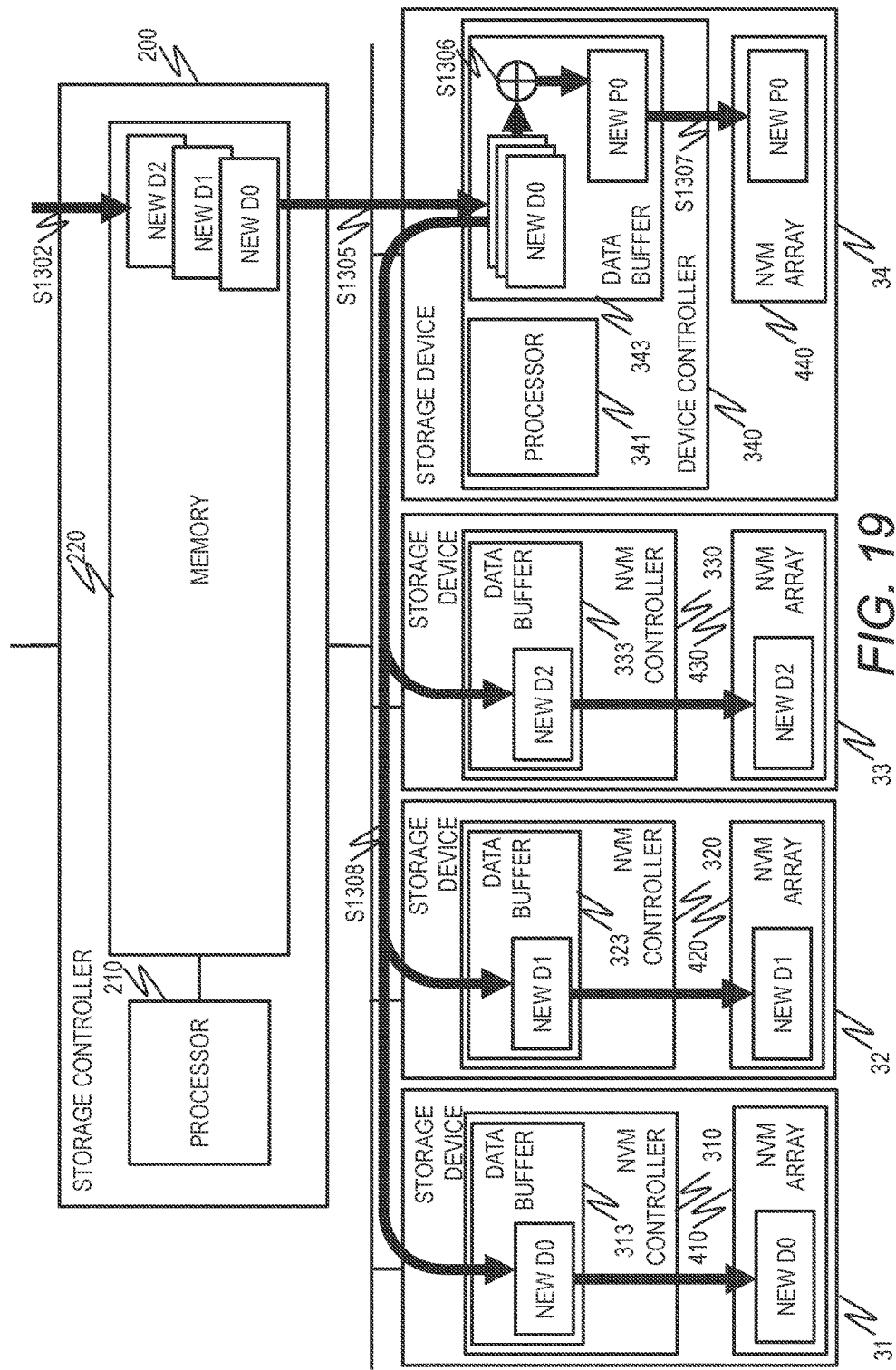
FIG. 19 is a diagram of data flows according to the fourth embodiment.
Figure 20A:
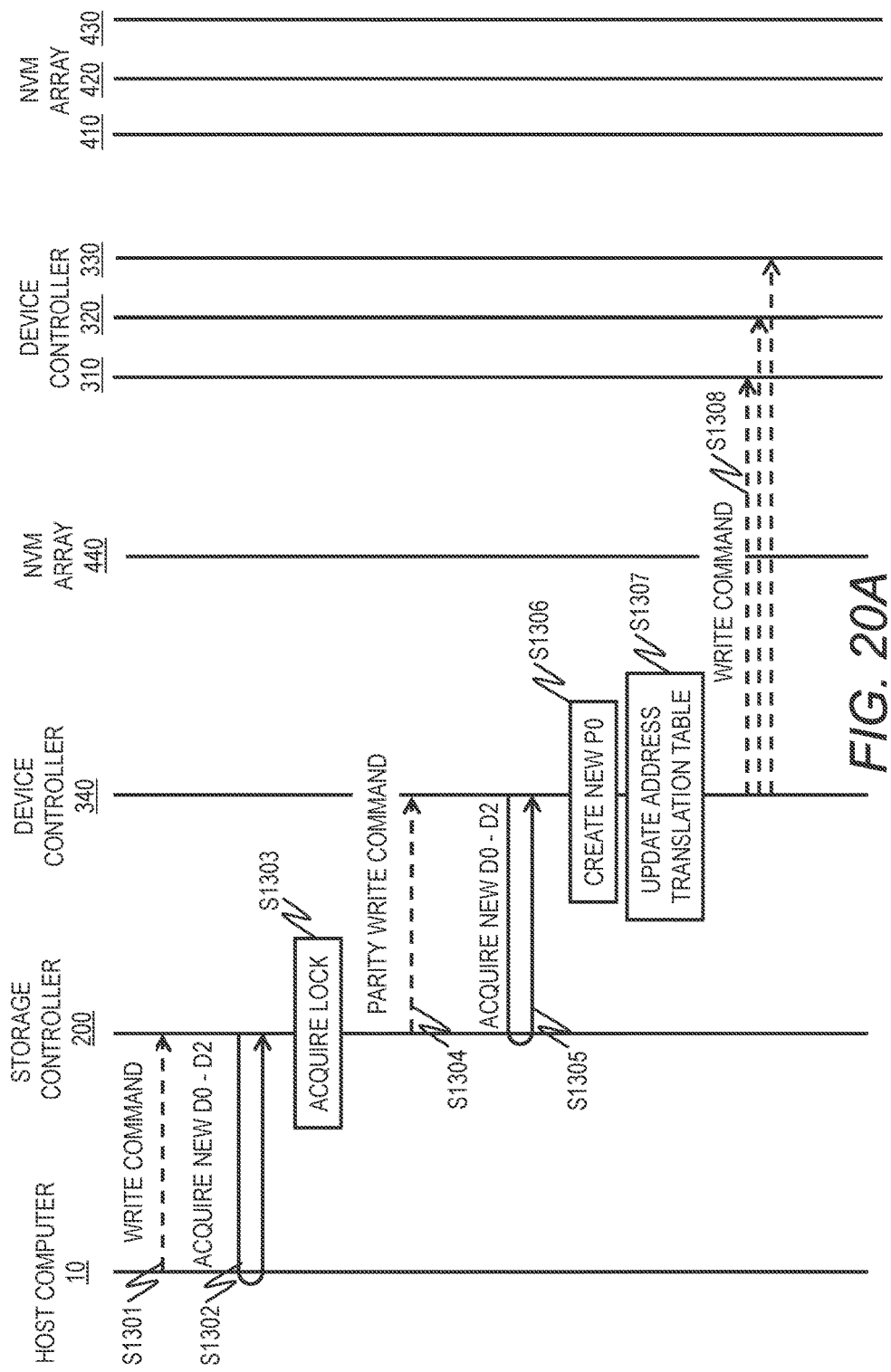
FIG. 20A is a diagram of a ladder chart depicting an operation according to the fourth embodiment.
Figure 20B:
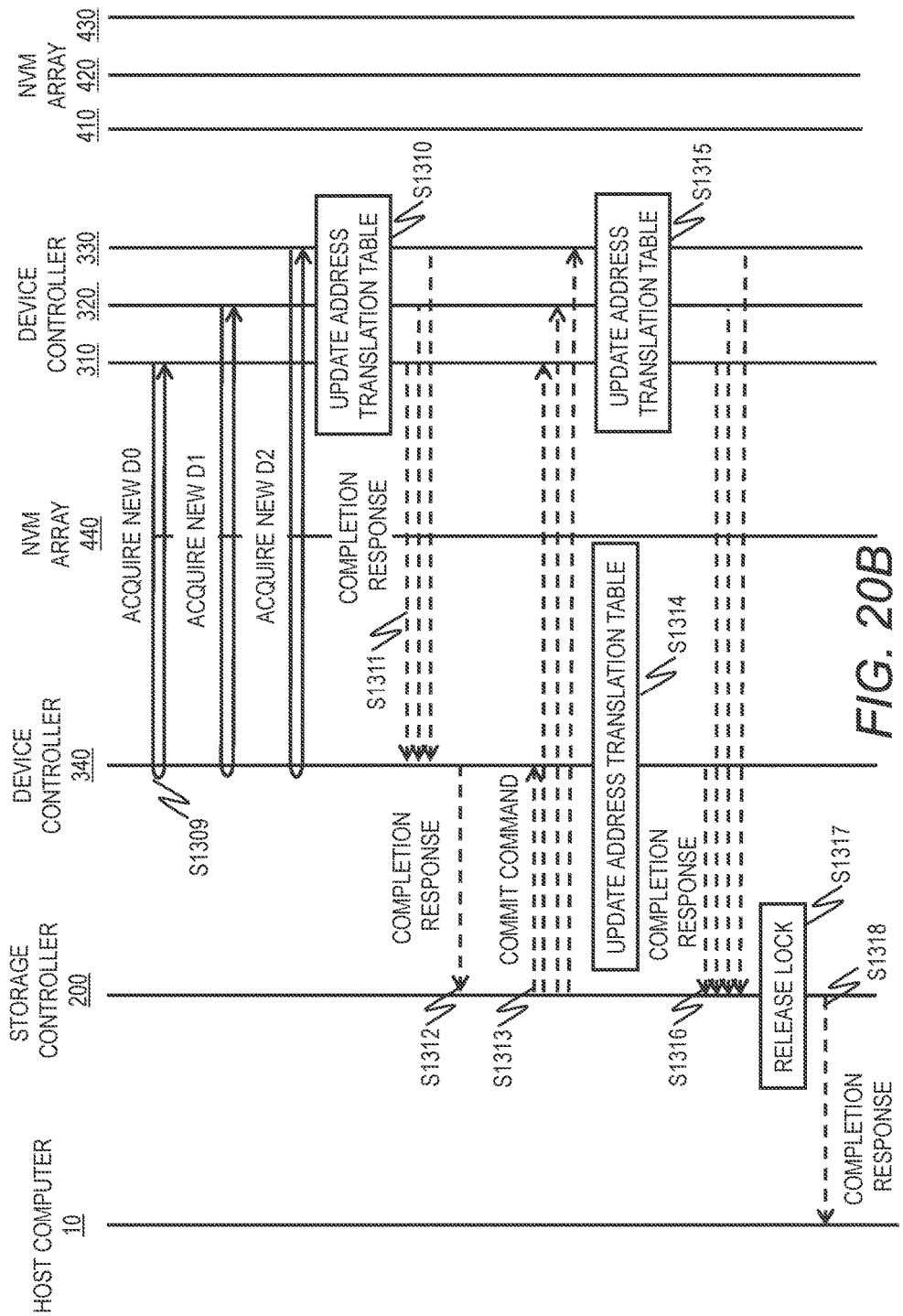
FIG. 20B is a diagram of the ladder chart depicting the operation according to the fourth embodiment.

FIG. 19 depicts data flows between the devices during execution of a write. FIGS. 20A and 20B depict a ladder chart of a process for executing a write.

Since steps S1301 to S1303 are similar to steps S701 to 703 of the first embodiment, the description thereof will be omitted. The data acquired from the host computer 10 by the storage controller 200 is new Data 0, new Data 1 and new Data 2.

Next, the processor 210 determines whether to perform the parity update as either a random write or a sequential write. In this embodiment, since new Data 0, 1 and 2 for three logical blocks in a stripe are received, the processor 210 decides to update the parity as a sequential write.

In step S1304, the storage controller 200 transfers a parity write command to the storage device 34. Specifically, first, the processor 210 refers to the RAID management information 810, and identifies the storage devices 31, 32 and 33 and the respective device LBAs of the storage destinations of new Data 0, 1 and 2 from the storage LBA specified by the write command acquired in step S1301. Further, the processor 210 identifies the storage device 34 and the device LBA as the storage destination of parity data 514 of the stripe 0 to which the logical blocks to be updated belong. Next, the processor 210 creates a parity write command on the memory 220. The parity write command is a command instructing calculation of new parity data from new Data 0, 1 and 2 to be transferred. The parity write command includes information for specifying the write destination device LBA of new Parity 0, the storage location information of new Data 0, 1 and 2 in the memory 220, and information for identifying the respective storage destination storage devices of new Data 0, 1 and 2.

In step S1305, the device controller 340 acquires new Data 0, 1 and 2 from the storage controller 200.

In step S1306, the device controller 340 creates new Parity 0 based on new Data 0, 1 and 2. Specifically, in the device controller 340, the processor 341 issues an instruction to the parity calculation unit 344 to read out new Data 0, 1 and 2 stored in the data buffer 343 to execute parity calculation, and store the calculation result as new Parity 0 into the data buffer 343.

In step 1307, the processor 341 records the storage location of new Parity 0 in the update information 613 of the address translation table 610 and manages both new Parity 0 and old Parity 0. Since it is the same as in the first embodiment, the details are omitted.

In step S1308, the device controller 340 creates write commands to be transferred respectively to the storage devices 31, 32 and 33, and transfers the created write commands. Step S1308 for transferring the write command to step S1311 for returning a completion response to the write command are similarly performed for writing new Data 0, 1 and 2 respectively to the storage devices 31, 32 and 33. Here, steps S1308 to S1311 will be described taking the write of new Data 0 to the storage device 31 as an example. First, the processor 341 of the device controller 340 creates a write command on the data buffer 343. The processor 341 includes, in the write command, the storage destination device LBA of new Data 0 identified based on the RAID management information 810 and the information on the storage device of the storage destination of new Data 0 included in the parity write command, and the location information of new Data 0 in the data buffer 343. Then, the processor 341 instructs the I/O interface 345 to notify the storage device 31 of the creation of the write command. In the notified storage device 31, the processor 311 instructs the I/O interface 315 to transfer write commands on the data buffer 343 to the data buffer 313 one by one.

In step S1309, the device controller 310 acquires new Data 0 from the device controller 340.

In step S1310, the processor 311 records the storage location of new Data 0 in the update information 613 of the address translation table 610 and manages both new Data 0 and old Data 0. Since it is the same as in the first embodiment, the details are omitted.

In step S1311, the device controller 310 returns a write command completion response to the device controller 340. In step S1312, upon receiving the completion response to the write command from each of the storage devices 31 to 34, the device controller 340 returns a completion response to the parity write command to the storage controller 200.

Since steps S1313 to S1318 are similar to steps S716 to S723 of the first embodiment, the description thereof are omitted. Since the fourth embodiment is targeted on the sequential write, the storage controller 200 releases the lock in S1315 after sending commit commands respectively to the storage devices 31 to 34 in the RAID group in S1313 and receiving completion responses respectively from the storage devices 31 to 34 in S1316.

The above described process eliminates the necessity for the storage controller to create parity data even in the case of sequential write, reducing the load on the storage controller. Even when the storage controller does not have the parity creation function, parity data can be created efficiently, and the write process speeds up. The operation of the fourth embodiment has been described above. FIGS. 19, 20A and 20B explain an example in which the storage controller transfers the new data to the device storing the old parity, and the device storing the old parity creates the new parity and then instructs the other storage devices belonging to the same RAID stripe to write data. However, the storage controller may transfer the new data to the disk which stores the old data, and the device which stores the old data may instruct the other storage devices belonging to the same RAID stripe to write data.

Further, although the fourth embodiment is targeted on the sequential write arising in the host computer, the sequential write occurring in the storage device may be the target as in the second embodiment. In this case, the storage device in which the sequential write has occurred carries out parity calculation and instructs each storage device with a write target logical block to update the data, thereby performing the parity update. The fourth embodiment describes the operation in the storage device with the system configuration 1; however, the present invention is not limited to this. The present invention may be applied to any configuration including a plurality of storage devices and a host device which manages them. For example, the present invention may be applied to the system configuration 2.

Fifth Embodiment

The fifth embodiment describes a parity update process while rebuilding a storage device.

First, the rebuild will be described based on the data arrangement in FIG. 7. The device controller 310 has a function of XOR operation and can execute a data restoration process. As an example, the storage device 32 fails and is replaced with a new storage device 35. First, the storage controller 200 instructs the storage device 35 to execute the rebuild. Upon receiving the instruction, the device controller 310 of the storage device 35 restores the data in order from the head of the device LBA. First, for restoring the Data 1 belonging to the stripe 0, the device controller 310 of the storage device 35 instructs the other storage devices 31, 33, and 34 in the RAID group to transfer the data and the parity data belonging to the stripe 0. Then, the device controller 310 of the storage device 35 executes the XOR operation of the transferred Data 0, Data 2 and Parity 0 to restore the Data 1. Further, the device controller 310 sequentially restores the data 5, the parity 2 and so on, to restore all the data stored in the storage device 32. After all the data is restored, the device controller 310 of the storage device 35 transmits a response indicating that the rebuild has been completed to the storage controller 200.

When the storage controller 200 receives a write command instructing a data update to the storage device 35 in a rebuild and the area specified by the write command is before data restoration, writing the write data and updating the parity data result in inconsistency. Therefore, consistency of data can be maintained by one of the following two processes.

Figure 21:
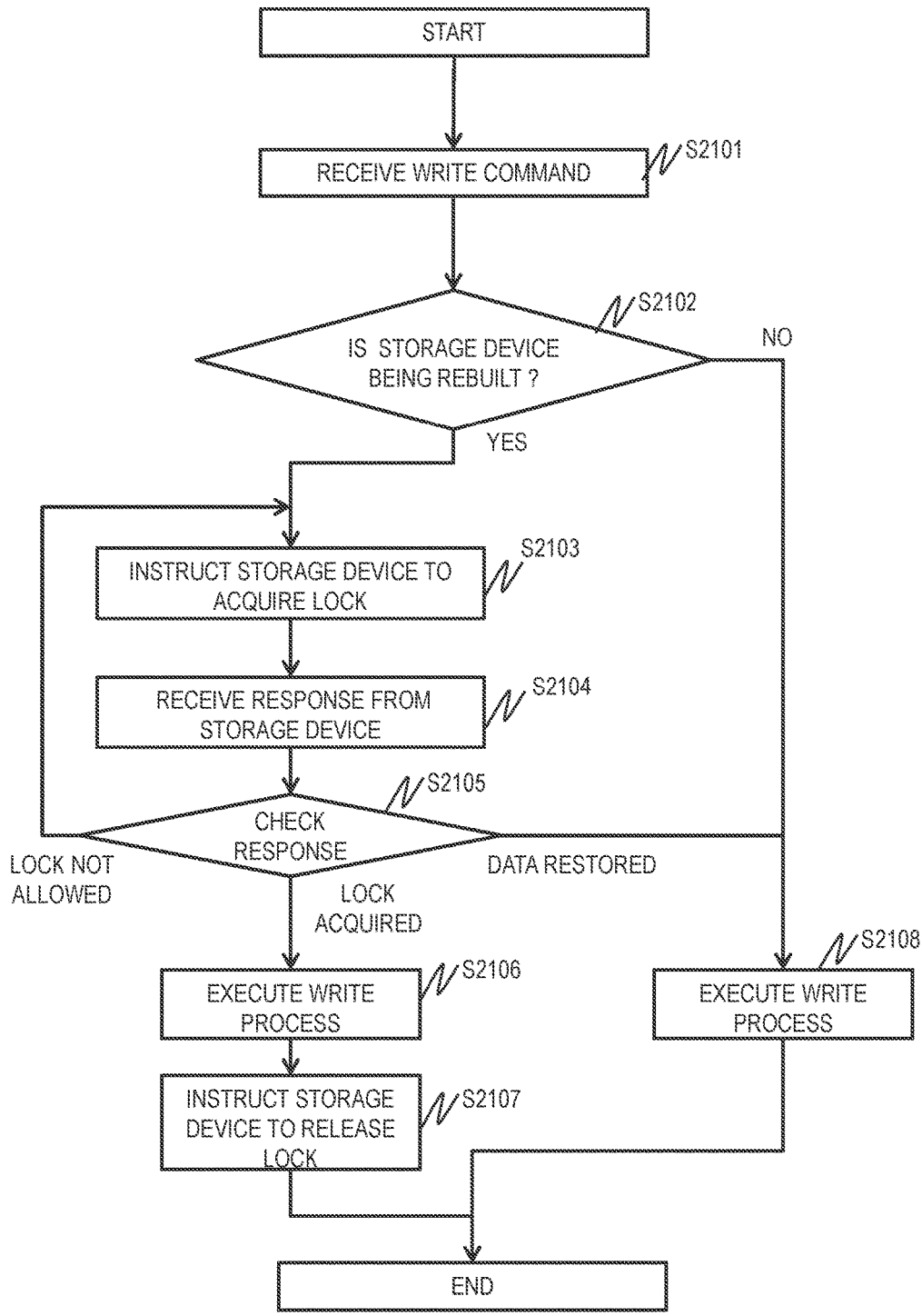
FIG. 21 is a diagram of a flowchart according to the fifth embodiment.
Figure 22:
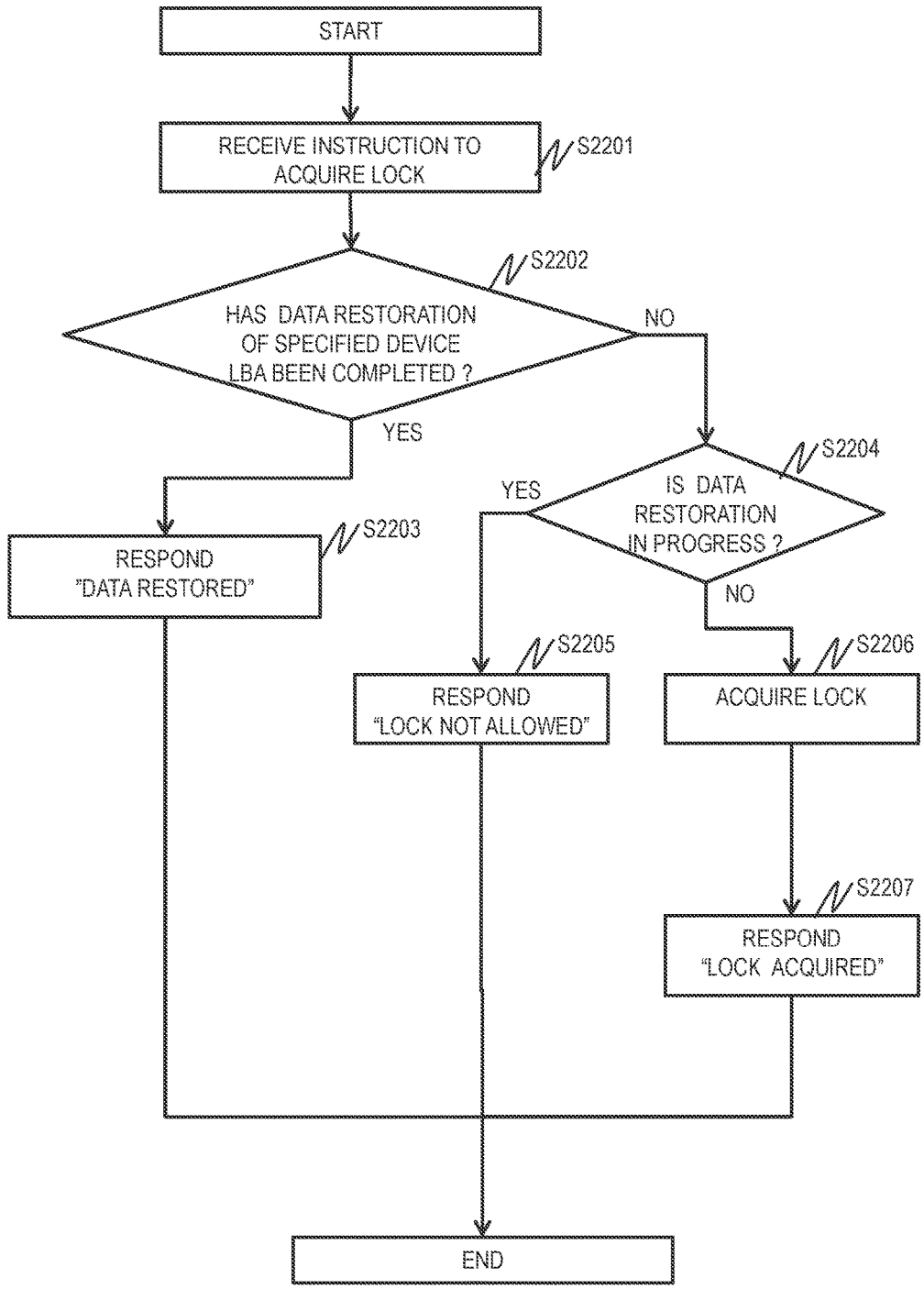
FIG. 22 is a diagram of a flowchart according to the fifth embodiment.

The first process will be described with reference to FIGS. 21 and 22. FIG. 21 depicts a flowchart for the storage controller to perform a data update process to a storage device in a rebuild. FIG. 22 depicts a flowchart of the storage device in a rebuild.

In step S2101, the storage controller 200 receives a write command from the host computer 10.

In step S2102, the storage controller 200 which has received the write command identifies the target storage device for the data update, and determines whether the storage device is being rebuilt. As an example, the storage device 35 is the target storage device. When the storage device 35 is being rebuilt (step S 2102: Yes), the storage controller 200 proceeds to step S2103.

In step S2103, the storage controller 200 instructs the storage device 35 to acquire the lock on the device LBA of the data update target.

Here, a flowchart of the storage device upon receiving the instruction to acquire the lock will be described with reference to FIG. 22.

In step S2201, the device controller 310 of the storage device 35 receives an instruction to acquire the lock.

In step S2202, the device controller 310 which has received the instruction to acquire the lock determines whether data restoration of the specified device LBA has been completed.

When the data restoration has been completed (step S2203: Yes), the device controller 310 provides the storage controller 200 with a response of "data restored" in step S2203. This is because a normal data write process can be executed when the data is already restored. When the data restoration has not been completed (step S2203: No), the device controller 310 determines whether the specified device LBA is undergoing data restoration in step S2204.

When the data restoration is in progress (step S2204: Yes), the device controller 310 provides the storage controller 200 with a response of "lock not allowed" in step S2205. A data update during data restoration results in inconsistency. In order to avoid the inconsistency, the device controller 310 responds that the locking is not allowed.

When the data restoration is not in progress (step S2204: No), the device controller 310 acquires the lock on the specified device LBA in step S206. While the device controller 310 holds the lock, the device controller 310 does not restore the data of the device LBA.

In step S2207, the device controller 310 provides the storage controller 200 with a response of "lock acquired".

The storage apparatus 20 returns to the process of the storage controller 200 in FIG. 21.

In step S2104, the storage controller 200 receives a response to the lock acquisition instruction from the storage device 35. In step S2105, upon receiving the response, the storage controller 200 checks the response and determines the next step to be executed based on the response.

When the response indicates "lock not allowed", the storage controller 200 executes step S2103 again. As a result, inconsistency due to a data update during data restoration can be avoided.

When the response indicates "lock acquired", the storage controller 200 executes the write process described in the first embodiment to the storage device 35 in step S2106. While the lock is held, the storage device does not perform the data restoration. Therefore, the data inconsistency does not occur even if the write process is executed. Upon completion of the write process, the storage controller 200 instructs the storage device 35 to release the lock in step S2107. Upon receiving the instruction to release the lock, the storage device 35 releases the lock on the locked device LBA.

When the content of the response is "data restored", the storage controller 200 executes the write process described in the first embodiment in step S2108.

The above process allows updates of data and parity data while maintaining the consistency of data even if a write process occurs during a rebuild.

Next, the second process for executing a write process during a rebuild will be described. In this case, the storage controller 200 instructs the storage device 35 to preferentially restore the data at the device LBA, which is the target of the write process, instead of instructing the storage device 35 to acquire the lock. Upon receiving the instruction, the device controller 310 of the storage device 35 executes the data restoration of the instructed device LBA. Upon completion of the data restoration, the device controller 310 records the device LBA for which the data restoration has been completed in the memory 312, and notifies the storage controller 200 that the device LBA has completed. Upon receiving the completion notification, the storage controller executes the write process described in the first embodiment. In this process, data and parity data can be updated while maintaining the consistency of data during a rebuild.

CITATION LIST

10: Host computer
20: Storage apparatus
200: Storage controller
31-34: Storage device
80: Server

What is claimed is:
1. An information processing system comprising:
a plurality of storage devices constituting a RAID group, coupled to a bus and configured to communicate with each other,
wherein each of the plurality of storage devices includes a device controller and a storage medium for storing data,
wherein the plurality of storage devices include a first storage device storing old data and a second storage device storing old parity associated with the old data,
wherein a first device controller of the first storage device is configured to create intermediate parity based on the old data and new data for updating the old data and transmit the intermediate parity to the second storage device specifying the second storage device storing the old parity associated with the old data,
wherein a second device controller of the second storage device is configured to create new parity based on the intermediate parity and the old parity,
wherein each of the plurality of storage devices is configured to receive RAID management information,
wherein the RAID management information contains information of a RAID level of the RAID group, a number of blocks of data and a number and blocks of parity included in a stripe including a plurality of blocks of data and at least one block of parity created from the plurality of blocks of data, a size of a block of data and parity included in the stripe, and a device logical block address (LBA) for uniquely identifying a storage area of each of the plurality of storage devices, and
wherein the first device controller is configured to identify the second storage device storing the old parity based on the RAID management information and transmit an instruction to create the new parity based on the intermediate parity and the old parity specifying a device LBA associated with the old parity in the second storage device.
2. The information processing system according to claim 1,
wherein the first device controller is configured to maintain the old data and the new data in a readable state after receiving the new data.
3. The information processing system according to claim 2,
wherein the first device controller is configured to discard the old data after receiving a commit command notifying completion of an update of the new parity.
4. The information processing system according to claim 2,
wherein the second device controller is configured to discard the old parity after receiving a commit command notifying completion of of an update of the new parity.
5. The information processing system according to claim 1,
wherein the second device controller is configured to maintain the old parity and the new parity in a readable state after creating the new parity.
6. The information processing system according to claim 1,
wherein the second device controller is configured to:
upon receiving a plurality of blocks of new data respectively for updating a plurality of blocks of old, create new parity based on the plurality of blocks of the new data, and
transfer the plurality of blocks of the new data respectively to a plurality of other storage devices included in the RAID group.
7. A storage apparatus comprising:
a plurality of storage devices each including a device controller and a storage medium for storing data and configured to communicate with each other;
a storage controller coupled to the plurality of storage devices via a bus and configured to control the plurality of storage devices as a RAID group,
wherein the plurality of storage devices include a first storage device storing old data and a second storage device storing old parity associated with the old data,
wherein the storage controller transmits new data for updating the old data to the first storage device,
a first device controller of the first storage device is configured to create intermediate parity based on the old data and the new data, and transmit the intermediate parity to the second storage device specifying the second storage device storing the old parity associated with the old data,
wherein a second device controller of the second storage device is configured to create new parity based on the intermediate parity and the old parity,
wherein each of the plurality of storage devices is configured to receive RAID management information,
wherein the RAID management information contains information of a RAID level of the RAID group, a number of blocks of data and a number and blocks of parity included in a stripe including a plurality of blocks of data and at least one block of parity created from the plurality of blocks of data, a size of a block of data and parity included in the stripe, and a device logical block address (LBA) for uniquely identifying a storage area of each of the plurality of storage devices, and
wherein the first device controller is configured to identify the second storage device storing the old parity based on the RAID management information and transmit an instruction to create the new parity based on the intermediate parity and the old parity specifying a device LBA associated with the old parity in the second storage device.

8. The storage apparatus according to claim 7,
wherein the storage controller is configured to transmit a parity write command instructing an update of new parity associated with the new data to the first storage device.

9. The storage apparatus according to claim 8,
wherein the first storage device is configured to:
upon receiving the parity write command, transmit a parity update command instructing the second storage device to create the new parity based on the intermediate parity and the old parity, and
upon receiving a completion response to the parity update command from the second storage device, transmit a completion response to the parity write command to the storage controller.

10. The storage apparatus according to claim 9,
wherein the storage controller is configured to, upon receiving a completion response to the parity write command from the first storage device, transmit a commit command notifying completion of the update of the new parity to the first storage device and the second storage device.

11. The storage apparatus according to claim 10,
wherein the first device controller is configured to notify an occurrence of a timeout of the storage controller when the first device controller does not receive a completion response from the second storage device even after a lapse of a predetermined time after transmitting the parity update command to the second storage device.

12. The storage apparatus according to claim 11,
wherein the storage controller is coupled to a management computer including an output screen, and configured to, upon receiving a notification of the occurrence of the timeout, cause the output screen of the management computer to display an occurrence status of the timeout between the first storage device and the second storage device.

13. A storage device comprising:
a device controller; and
a storage medium for storing old data,
wherein the device controller is coupled to a plurality of other storage devices to communicate with each other, the storage device and the plurality of other storage devices being controlled as a RAID group,
wherein the device controller is configured to create intermediate parity based on the old data and new data for updating the old data and transmit the intermediate parity specifying a specific storage device storing old parity associated with the old data in the plurality of other storage devices, and transmit an instruction to create new parity based on the intermediate parity and the old data to the specific storage device,
wherein the device controller is configured to receive RAID management information containing information of a RAID level of the RAID group, a number of blocks of data and a number and blocks of parity included in a stripe including a plurality of blocks of data and at least one block of parity created from the plurality of blocks of data, a size of a block of data and parity included in the stripe, and a device logical block address (LBA) for uniquely identifying a storage area of each of the plurality of storage devices, and
wherein the device controller is configured to identify the specific storage device storing the old parity based on the RAID management information, and transmit an instruction to create the new parity based on the intermediate parity and the old parity specifying a device LBA associated with the old parity in the specific storage device.

14. The storage device according to claim 13,
wherein the device controller is configured to maintain the old data and the new data in a readable state after receiving the new data.

15. The storage device according to claim 14,
wherein the device controller is configured to discard the old parity after receiving a commit command notifying completion of of an update of the new parity.

16. An information processing system comprising:
a plurality of storage devices constituting a RAID group, coupled to one bus and configured to communicate with each other,
wherein each of the plurality of storage devices includes a device controller and a storage medium for storing data,
wherein the plurality of storage devices includes a first storage device storing first old data and a second storage device storing second old data associated with the first old data, the second old data being the same data as the first old data,
wherein a first device controller of the first storage device is configured to, when the first old data is updated to first new data, transmit the first new data to the second storage device specifying the second storage device storing the second old data associated with the first old data,
wherein the device controller of each of the plurality of storage devices is configured to receive RAID management information containing information of a RAID level of the RAID group, a number of blocks of data included in a stripe including a plurality of blocks of data, a size of a block of data included in the stripe, and a device logical block address (LBA) for uniquely identifying a storage area of each of the plurality of storage devices, and
wherein the first device controller is configured to identify the second storage device storing the second old data based on the RAID management information, and transmit the first new data specifying a device LBA associated with the second old data in the second storage device.

17. The information processing system according to claim 16,
wherein the first device controller is configured to maintain the first old data and the first new data in a readable state after receiving the first new data.

18. The information processing system according to claim 17,
wherein the first device controller is configured to discard the first old data after receiving a commit command notifying completion of storing the first new data into the second storage device.

* * * * *